(12) United States Patent
Tsuzuki et al.

(10) Patent No.: US 8,280,720 B2
(45) Date of Patent: Oct. 2, 2012

(54) ASSOCIATION DICTIONARY CREATION APPARATUS

(75) Inventors: Takashi Tsuzuki, Osaka (JP); Hiroshi Kutsumi, Osaka (JP)

(73) Assignee: Panasonic Corporation, Osaka (JP)

( * ) Notice: Subject to any disclaimer, the term of this patent is extended or adjusted under 35 U.S.C. 154(b) by 952 days.

(21) Appl. No.: 11/507,639

(22) Filed: Aug. 22, 2006

(65) Prior Publication Data

US 2006/0282258 A1    Dec. 14, 2006

Related U.S. Application Data

(63) Continuation of application No. PCT/JP2005/023919, filed on Dec. 27, 2005.

(30) Foreign Application Priority Data

Jan. 7, 2005  (JP) .................... 2005-003171

(51) Int. Cl.
*G06F 17/27* (2006.01)

(52) U.S. Cl. .................... 704/9; 707/3; 707/101; 707/4; 707/1; 707/5; 725/28; 725/34; 704/277; 704/2; 704/246; 709/217; 709/203; 348/570; 379/211.01

(58) Field of Classification Search .............. 704/2, 277, 704/246; 707/1, 3, 5, 101, 4; 725/28, 34; 709/217, 203; 348/570; 379/211.01
See application file for complete search history.

(56) References Cited

U.S. PATENT DOCUMENTS

| | | | |
|---|---|---|---|
| 5,905,980 A | | 5/1999 | Masuichi et al. |
| 5,973,750 A | * | 10/1999 | Ogawa et al. .................. 348/570 |
| 6,029,165 A | * | 2/2000 | Gable .................... 1/1 |
| 6,553,566 B1 | * | 4/2003 | Grant et al. .................... 725/28 |
| 7,065,550 B2 | * | 6/2006 | Raghunandan ............... 709/203 |
| 7,181,438 B1 | * | 2/2007 | Szabo .................... 1/1 |
| 7,209,942 B1 | * | 4/2007 | Hori et al. .................... 709/203 |

(Continued)

FOREIGN PATENT DOCUMENTS

GB    2 362 734    11/2001

(Continued)

OTHER PUBLICATIONS

Isamu Watanabe et al., "*Text Mining Based on Keyword Association*", vol. 99, No. 57, pp. 57-64, 99-FI-55-8 (Jul. 16, 1999), Report of Research of Information Processing Society of Japan.

(Continued)

*Primary Examiner* — Michael Colucci
(74) *Attorney, Agent, or Firm* — Wenderoth Lind & Ponack, L.L.P.

(57) ABSTRACT

An association dictionary creation apparatus is provided that is capable of easily and efficiently creating an association dictionary suiting the user's taste. The association dictionary creation unit includes: a profile storage unit that stores a profile which is information regarding the user's taste; a word selection unit that determines, every predetermined time, a word from the profile stored in the profile storage unit as an associated word search word, and further, selects words, other than the associated word search word, included in the profile as the associated word candidates; and an association degree calculation unit that calculates the degree of association between the associated word search word and each associated word candidate word selected by the word selection unit with reference to the contents stored in the contents storage unit, and when the association degree is higher than a predetermined threshold value, sets the associated word search word and the associated word candidate word as the associated word pair and stores the associated word pair and the association degree in the association dictionary storage unit in association with each other.

22 Claims, 15 Drawing Sheets

U.S. PATENT DOCUMENTS

| | | | |
|---|---|---|---|
| 7,340,460 B1 * | 3/2008 | Kapur et al. | 1/1 |
| 2001/0041977 A1 * | 11/2001 | Aoyagi et al. | 704/246 |
| 2002/0042790 A1 * | 4/2002 | Nagahara | 707/4 |
| 2002/0059180 A1 * | 5/2002 | Aoki et al. | 707/1 |
| 2002/0198701 A1 * | 12/2002 | Moore | 704/2 |
| 2003/0126227 A1 * | 7/2003 | Zimmerman et al. | 709/217 |
| 2004/0006483 A1 * | 1/2004 | Sasaki et al. | 704/277 |
| 2004/0073918 A1 * | 4/2004 | Ferman et al. | 725/34 |
| 2005/0041793 A1 * | 2/2005 | Fulton et al. | 379/211.01 |
| 2006/0149719 A1 * | 7/2006 | Harris | 707/3 |
| 2006/0167918 A1 * | 7/2006 | Tsuzuki et al. | 707/101 |

FOREIGN PATENT DOCUMENTS

| | | |
|---|---|---|
| JP | 8-77203 | 3/1996 |
| JP | 10-134075 | 5/1998 |
| JP | 10-207910 | 8/1998 |
| JP | 2000-348042 | 12/2000 |
| JP | 2001-117935 | 4/2001 |
| JP | 2004-348607 | 12/2004 |

OTHER PUBLICATIONS

Kazuo Misue et al., "*Visualization of Keyword Association for Text Mining*", vol. 99, No. 57, pp. 65-72, 99-FI-55-9 (Jul. 16, 1999), Report of Research of Information Processing Society of Japan.

M. Shimohata et al., "*Information Retrieval System Using Association Dictionary*", vol. 65, No. 1 (Jan. 1998), Oki Electric Industry Co., Ltd.

* cited by examiner

FIG. 2

| Associated word 1 | Associated word 2 | Association degree |
|---|---|---|
| Taro Matsushita | Jiro Matsushita | 80 |
| Taro Matsushita | Hanako Matsushita | 70 |
| Jiro Matsushita | Hanako Matsushita | 90 |
| Jiro Matsushita | Saburo Matsushita | 80 |
| ⋮ | ⋮ | ⋮ |

FIG. 3

| Label | Data | Weight value |
|---|---|---|
| <Performer's name> | Taro Matsushita | 90 |
| <Performer's name> | Jiro Matsushita | 85 |
| <Performer's name> | Saburo Matsushita | 80 |
| <Performer's name> | Hanako Matsushita | 80 |
| <Genre> | Drama | 90 |
| <Broadcasting time> | 12:00~13:00 | 90 |
| ⋮ | ⋮ | ⋮ |

FIG. 6

| Associated word 1 | Associated word 2 | Association degree |
|---|---|---|
| Taro Matsushita | Jiro Matsushita | 124 |
| Taro Matsushita | Hanako Matsushita | 56 |
| Jiro Matsushita | Hanako Matsushita | 72 |
| Jiro Matsushita | Saburo Matsushita | 64 |
| : | : | : |

FIG. 9

| Associated word 1 | Associated word 2 | Association degree |
|---|---|---|
| Taro Matsushita | Jiro Matsushita | 64 |
| Taro Matsushita | Hanako Matsushita | 116 |
| Hanako Matsushita | Saburo Matsushita | 70 |
| Jiro Matsushita | Hanako Matsushita | 72 |
| Jiro Matsushita | Saburo Matsushita | 64 |
| ⋮ | ⋮ | ⋮ |

FIG. 10

```
<HTML>
<BODY>
Performers' links<BR>

<A HREF="taro.html">Taro Matsushita</A><BR>
<A HREF="hanako.html">Hanako Matsushita</A><BR>
<A HREF="saburo.html">Saburo Matsushita</A><BR>
<A HREF="jiro.html">Jiro Matsushita</A><BR>

</BODY>
</HTML>
```

FIG. 11A
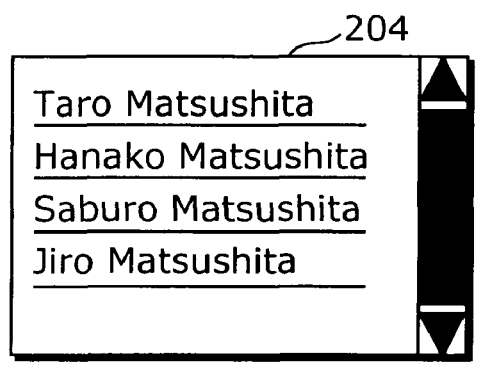
FIG. 11B
Taro Matsushita
Hanako Matsushita
Saburo Matsushita
Jiro Matsushita
FIG. 12A
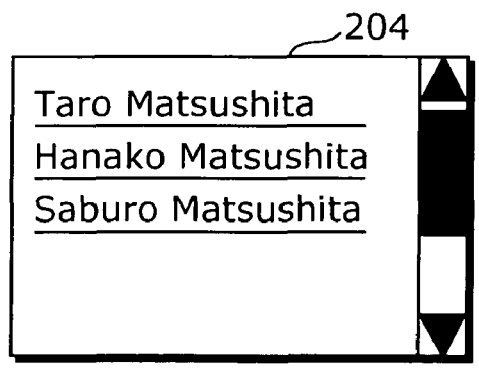
FIG. 12B
Taro Matsushita
Hanako Matsushita
Saburo Matsushita

FIG. 15

| Associated word 1 | Associated word 2 | Association degree |
|---|---|---|
| Taro Matsushita | Hanako Matsushita | 60 |
| Hanako Matsushita | Saburo Matsushita | 70 |

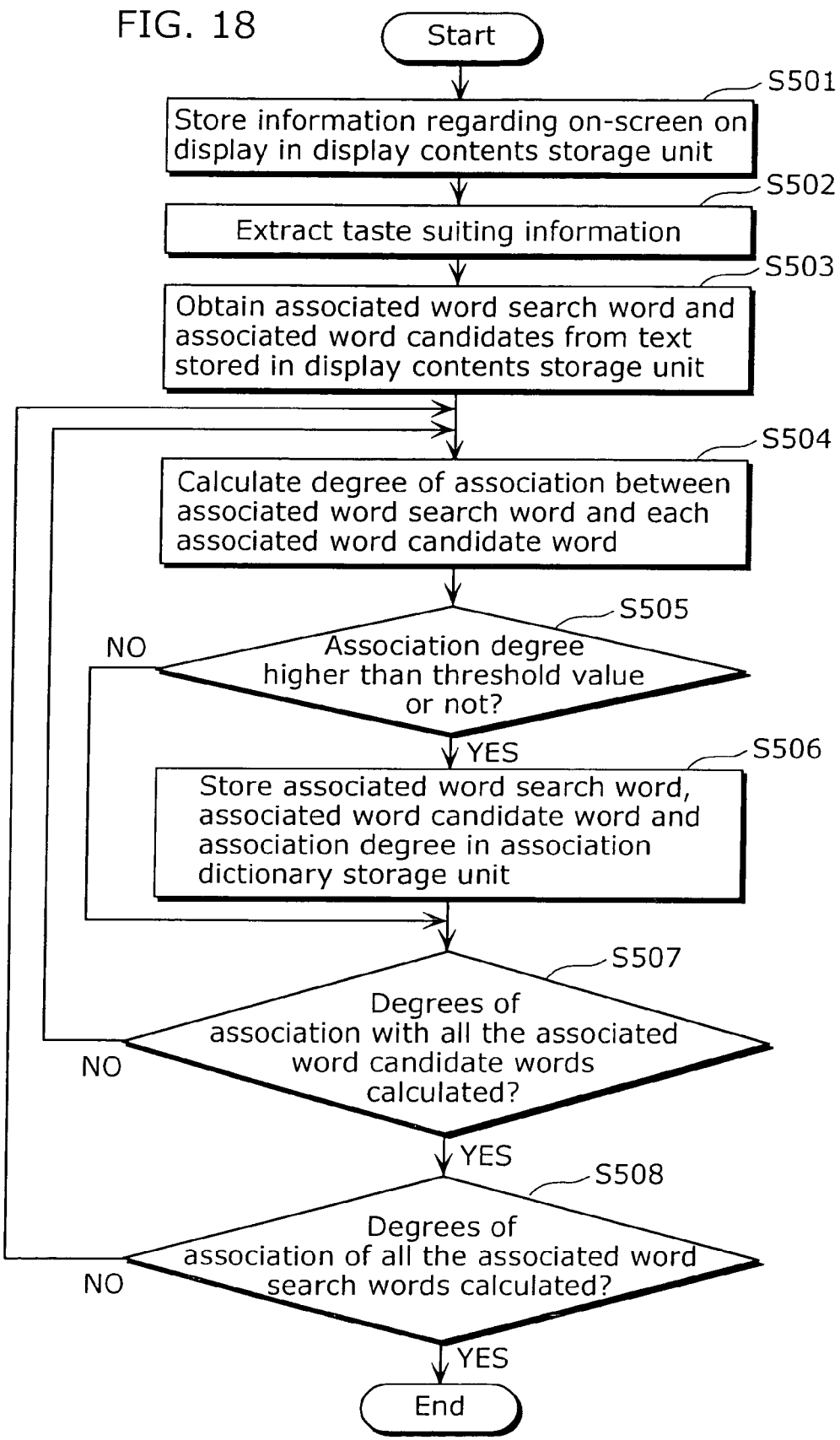

ASSOCIATION DICTIONARY CREATION APPARATUS

CROSS REFERENCE TO RELATED APPLICATION

This is a continuation of PCT Patent Application No. PCT/JP2005/23919, filed Dec. 27, 2005.

BACKGROUND OF THE INVENTION (1) Field of the Invention

The present invention relates to an association dictionary creation apparatus that creates an association dictionary storing the association between words in the information stored in a database.

(2) Description of the Related Art

Examples of conventionally known methods for creating an association dictionary used for searching a database include: to manually determine the relationship between words in the information in a database to create an association dictionary; and to automatically create an association dictionary by using occurrence frequency information for all the words in an electronic document. In addition, a document processing apparatus has been disclosed in which in order to create an association dictionary for each field, the user inputs a search criterion and an association dictionary for the document matching the inputted criterion is created, whereby an association dictionary fit for the field indicated by the search criterion can be created (for example, see Japanese Laid-Open Patent Application No. H10-134075). Moreover, an association dictionary creation apparatus has been disclosed in which in order to meet individual needs, the degree of association between the search keyword inputted by the user and an associated word selected by the user from among a plurality of associated word candidates corresponding thereto is increased, whereby an association dictionary adapted to the user can be created (for example, see Japanese Laid-Open Patent Application No. 2000-348042).

However, with the conventional document processing apparatus that creates an association dictionary for each field and uses it, it is necessary for the user to input a search criterion in order to create the association dictionary for each field. For this reason, when the user creates an association dictionary for a field suiting his or her taste, to obtain a highly accurate association dictionary, the user has to input an optimum search criterion indicative of the field. Considering an optimum search criterion like this is extremely difficult for the user. For example, a user who frequently watches information programs covering news, entertainment information, economic/market conditions and the like cannot determine which of "news", "entertainment", "economy", and "information" should be inputted as the search criterion in order to obtain a highly accurate association dictionary suiting his or her taste.

With the conventional association dictionary creation apparatus that creates an association dictionary adapted to the user by automatically changing the association degree by the user selecting an associated word for the search criterion, the user has to input all the search keywords suiting his or her taste and select associated words corresponding to the search keywords until an association dictionary adapted to the user is obtained; thus, the burden imposed on the user until the accuracy is improved is heavy. For example, in the case of an association dictionary in which a plurality of performers' names are stored in association with one performer's name, to improve the accuracy of the association dictionary, the user has to select, for a plurality of performers, a performer's name and a performer's name associated with the selected performer's name stored in the association dictionary; thus, the burden on the user is heavy.

SUMMARY OF THE INVENTION

Accordingly, the present invention is conceived in view of the above-described circumstances, and has as an object to provide an association dictionary creation apparatus capable of easily and efficiently creating an association dictionary suiting the user's taste.

In order to achieve the aforementioned object, the association dictionary creation apparatus according to the present invention is an association dictionary creation apparatus that creates an association dictionary storing a relationship between a plurality of words. The apparatus includes a word selection unit which selects an arbitrary word from information representative of a user's taste as an associated word search word, and selects words, other than the associated word search word, included in the information representative of the user's taste, as associated word candidates. The apparatus also includes an associated word storage unit which selects an associated word associated with the associated word search word from among the associated word candidates, based on a database storing information to be searched for, and stores the associated word search word and the associated word into the association dictionary in association with each other. According to this structure, an association dictionary suiting the user's taste can be easily and efficiently created.

As is apparent from the above description, according to the association dictionary creation apparatus of the present invention, an association dictionary storing only words suiting the user's taste can be easily and efficiently created.

The disclosure of Japanese Patent Application No. 2005-003171 filed on Jan. 7, 2005 and PCT Patent Application No. PCT/JP2005/23919 filed on Dec. 27, 2005, including specification, drawings and claims are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a diagram showing an example of the association dictionary stored in an association dictionary storage unit;

FIG. 3 is a diagram showing an example of a profile stored in a profile storage unit;

FIG. 6 is a diagram showing an example of the association dictionary stored in the association dictionary storage unit;

FIG. 9 is a diagram showing an example of the association dictionary stored in the association dictionary storage unit;

FIG. 10 is a diagram showing an example of the details of the contents searched for by the information search apparatus of the second and fourth embodiments;

FIG. 11A is a diagram showing an example of the details displayed on a display unit of the information search apparatus of the second and fourth embodiments;

FIG. 11B is a diagram showing an example of the details stored in a display contents storage unit of the information search apparatus of the second and fourth embodiments;

FIG. 12A is a diagram showing an example of the details displayed on the display unit of the information search apparatus of the second and fourth embodiments;

FIG. 12B is a diagram showing an example of the details stored in the display contents storage unit of the information search apparatus of the second and fourth embodiments;

FIG. 15 is a diagram showing an example of the association dictionary stored in the association dictionary storage unit;

FIG. 18 is a flowchart showing the flow of the operation of creating an association dictionary in the information search apparatus, according to the fourth embodiment.

DESCRIPTION OF THE PREFERRED INVENTION

Figure 1:
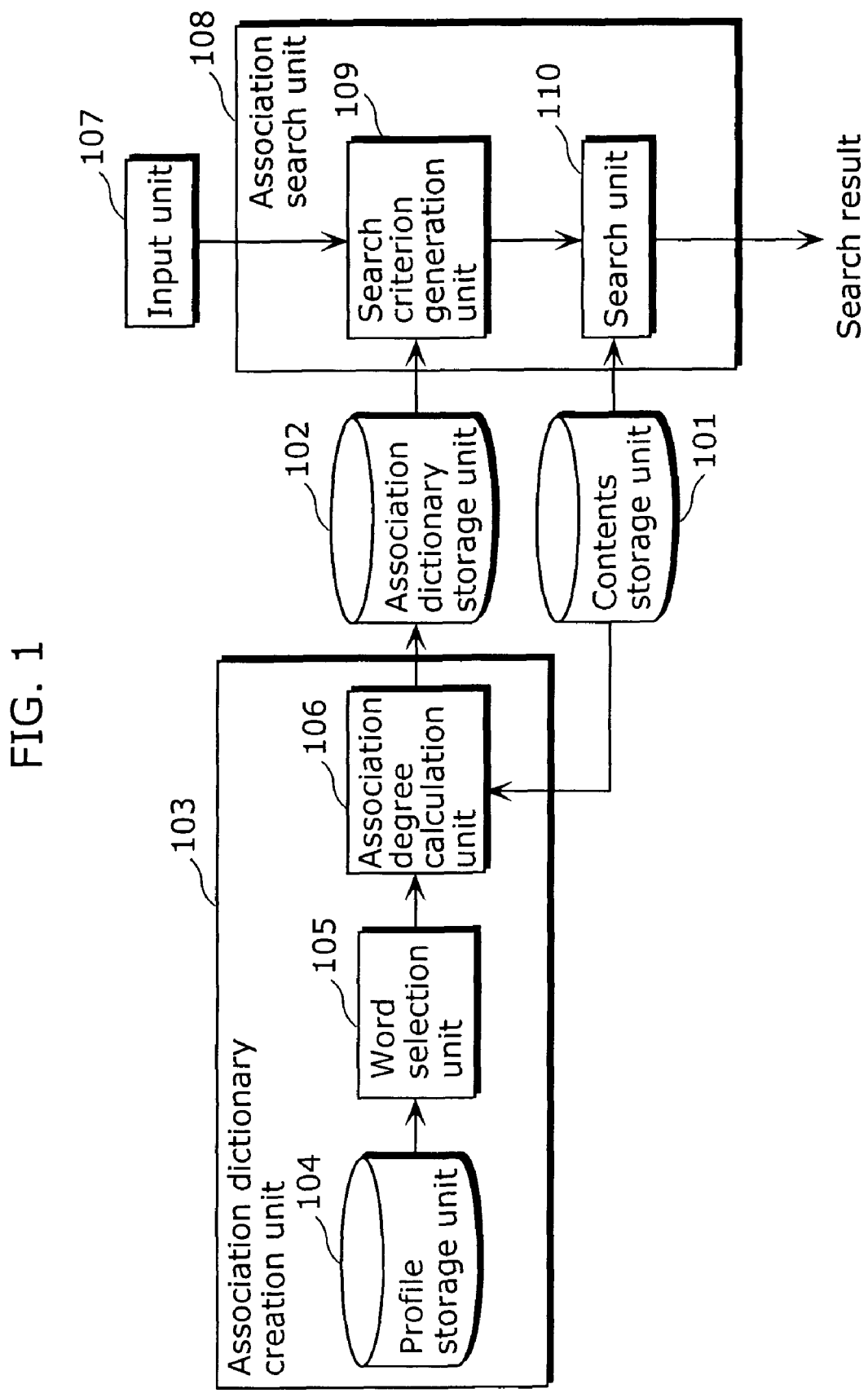
FIG. 1 is a block diagram showing the structure of an information search apparatus including an association dictionary creation apparatus according to a first embodiment of the present invention.

The association dictionary creation apparatus according to the present invention is an association dictionary creation apparatus that creates an association dictionary storing a relationship between a plurality of words. The apparatus includes a word selection unit which selects an arbitrary word from information representative of a user's taste as an associated word search word, and selects words, other than the associated word search word, included in the information representative of the user's taste, as associated word candidates. Additionally, the apparatus includes an associated word storage unit which selects an associated word associated with the associated word search word from among the associated word candidates, based on a database storing information to be searched for, and stores the associated word search word and the associated word into the association dictionary in association with each other. According to this structure, an association dictionary suiting the user's taste can be easily and efficiently created.

Here, it is possible that the word selection unit obtains the information representative of the user's taste from a profile in which information representative of the user's taste is stored. According to this structure, information representative of the user's taste can be easily obtained.

Moreover, it is possible that the associated word storage unit calculates a degree of association between the associated word search word and each of the associated word candidates, based on a frequency of occurrence in the data base, and selects an associated word candidate having a calculated degree of association which is not less than a threshold value as the associated word associated with the associated word search word. According to this structure, associated words with high association degrees can be selected, and an association dictionary storing the associated words with high association degrees can be created.

Moreover, it is possible that the association dictionary creation apparatus further includes a display information extraction unit which extracts information regarding an on-screen display perused by the user, and the word selection unit determines that the information regarding the on-screen display extracted by the display information extraction unit is the information representative of the user's taste, selects an arbitrary word from the information regarding the on-screen display as the associated word search word, and selects words, other than the associated word search word, included in the information regarding the on-screen display as associated word candidates. According to this structure, the information representative of the user's taste can be obtained from the information on the display perused by the user.

Moreover, it is possible that the association dictionary creation unit further includes a search unit which searches the database for information matching a search criterion, and the on-screen display perused by the user is a result of the information search, and the display information extraction unit extracts information regarding the result of the information search as the information regarding the on-screen display. According to this structure, the information representative of the user's taste can be obtained from the information on the result of the information search performed by the user.

Moreover, it is possible that the display information extraction unit extracts, from the result of the information search, information displayed on a display screen for not less than a predetermined time as the information regarding the on-screen display. According to this structure, for example, information displayed for only a short time can be excluded, without being determined to be the information perused by the user.

Moreover, it is possible that the on-screen display perused by the user is broadcast programs, and the display information extraction unit extracts information regarding the broadcast programs as the information regarding the on-screen display. According to this structure, an association dictionary adapted to the user's watching behavior can be created.

Moreover, it is possible that the display information extraction unit extracts information regarding a broadcast program, among the broadcast programs, which is displayed on a display screen for not less than a predetermined time, as the information regarding the on-screen display. According to this structure, for example, broadcast programs displayed for only a short time can be excluded, without being determined to be the programs perused by the user.

Moreover, it is possible that the association dictionary creation unit further includes a taste suiting information extraction unit which extracts information suiting the user's taste, from the database, as taste suiting information, using a profile in which information representative of the user's taste is stored, and the associated word storage unit selects an associated word associated with the associated word search word from among the associated word candidates by referring to the taste suiting information extracted from the database, and stores the associated word search word and the associated word into the association dictionary in association with each other. According to this structure, an association dictionary can be created in which the association degrees are adapted to the user.

Moreover, it is possible that the word selection unit determines that the taste suiting information extracted by the taste suiting information extraction unit is the information representative of the user's taste, selects an arbitrary word from the taste suiting information as the associated word search word, and selects words, other than the associated word search word, included in the taste suiting information as associated word candidates. According to this structure, an association dictionary storing only words suiting the user's taste can be created.

Moreover, it is possible that the word selection unit obtains the information representative of the user's taste from the profile in which information representative of the user's taste is stored, selects an arbitrary word from the information representative of the user's taste as the associated word search word, and selects words, other than the associated word search word, included in the information representative of the user's taste as associated word candidates. According to this structure, an association dictionary storing only words more suiting the user's taste can be created.

Moreover, it is possible that the association dictionary creation apparatus further includes: a display information extraction unit which extracts information regarding an on-screen display perused by the user; and a taste suiting information extraction unit which extracts information suiting the user's taste from the database as taste suiting information, using of a profile in which information representative of the user's taste is stored. The word selection unit determines that the information regarding the on-screen display extracted by the display information extraction unit is the information representative of the user's taste, selects an arbitrary word from the information regarding the on-screen display as the associated word search word, and selects words, other than the associated word search word, included in the information regarding the on-screen display as associated word candidates, and the associated word storage unit selects an associated word associated with the associated word search word from among the associated word candidates, by referring to the taste suiting information extracted from the database, and stores the associated word search word and the associated word into the association dictionary in association with each other. According to this structure, an association dictionary can be created in which only words adapted to the user's watching behavior are stored and the association degrees of the words are adapted to the user's taste.

The present invention can be realized not only as such an association dictionary creation apparatus but also as an association dictionary creation method where the characteristic units of such an association dictionary creation apparatus are steps and as a program that causes a computer to execute the steps. It should be noted that such a program can be distributed through recording media such as CD-ROMs and transmission media such as the Internet.

Hereinafter, embodiments of the present invention will be described with reference to the drawings.

(First Embodiment)

FIG. 1 is a block diagram showing the structure of an information search apparatus including an association dictionary creation apparatus according to a first embodiment of the present invention.

This information search apparatus is for creating an association dictionary storing the association between words and performing information search by using the association dictionary, and as shown in FIG. 1, includes a contents storage unit 101, an association dictionary storage unit 102, an association dictionary creation unit 103, an input unit 107, and an association search unit 108.

The contents storage unit 101 stores information such as information regarding television broadcast programs and information regarding contents accumulated on hard disk recorders and the like.

The association dictionary storage unit 102 stores an association dictionary representative of the relationship between words reflecting the user's taste for a plurality of words in the contents stored in the contents storage unit 101. FIG. 2 is a view showing an example of the association dictionary stored in the association dictionary storage unit 102. In the association dictionary storage unit 102, for example as shown in FIG. 2, associated word pairs each consisting of a pair of words associated with each other (associated word 1, associated word 2) and the association degrees representative of the degrees of association of the associated word pairs are stored so as to be associated with each other, and as the (associated word pair, association degree), the following are stored: ((Taro Matsushita, Jiro Matsushita), 80), ((Taro Matsushita, Hanako Matsushita), 70), ((Jiro Matsushita, Hanako Matsushita), 90), ((Jiro Matsushita, Saburo Matsushita), 80), . . . .

The association dictionary creation unit 103 is an association dictionary creation apparatus calculating, for the contents stored in the contents storage unit 101, the association degree of the word pair extracted from a profile which is information regarding the user's taste and storing the word pair that is the object of calculation and the calculated association degree in the association dictionary storage unit 102 so as to be associated with each other. The association dictionary creation unit 103 is provided with a profile storage unit 104, a word selection unit 105 and an association degree calculation unit 106.

The profile storage unit 104 stores the profile which is information regarding the user's taste. As an example, the profile includes the genres to which the user's favorite contents belong, the user's favorite titles and performers and the time of watching, and the weight value representative of the degree of preference associated with each piece of data (genres, titles, performers, watching time, etc.) are stored. FIG. 3 is a view showing an example of the profile stored in the profile storage unit 104. In the profile, for example as shown in FIG. 3, a label representative of the data kind, data and the weight value representative of the degree of the user's preference for the data are stored so as to be associated with one another, and as the (label, data, weight value), the following are stored: ((<Performer's name>, Taro Matsushita, 90), (<Performer's name>, Jiro Matsushita, 85), (<Performer's name>, Saburo Matsushita, 80), (<Performer's name>, Hanako Matsushita, 80), (<Genre>, Drama, 90), (<Broadcasting time>, 12:00-13:00, 90), . . . ).

The word selection unit 105 selects a word from the profile stored in the profile storage unit 104 every predetermined time, sets it as an associated word search word, and further, selects words other than the associated word search word included in the profile as the associated word candidates. As an example, the word selection unit 105 selects a piece of data from the profile of FIG. 3 stored in the profile storage unit 104, sets it as the associated word search word, and further, selects pieces of data other than the associated word search word included in the profile as the associated word candidates. Moreover, the associated word search word and the associated word candidates may be set for only pieces of data the weight values of which are not less than a predetermined threshold value.

The association degree calculation unit 106 calculates the degree of association between the associated word search word and each associated word candidate word selected by the word selection unit 105 with reference to the contents stored in the contents storage unit 101, and when the association degree is higher than a predetermined threshold value, the association degree calculation unit 106 sets the associated word search word and the associated word candidate word as the associated word pair, and stores the associated word pair and the association degree in the association dictionary storage unit 102 so as to be associated with each other. An example of the association degree calculation method is a method using mutual information (MI). Specifically, when the number of contents including a word W1 and a word W2 is a, the number of contents not including the word W1 and including the word W2 is b, the number of contents including the word W1 and not including the word W2 is c, the number of contents including neither the word W1 nor the word W2 is d and the total number of contents is N(=a+b+c+d), the association degree can be obtained by MI=log2(aN/((a+b)(a+c))). Another typical association degree calculation method is a method using a Dice coefficient, a weighted Dice coefficient, a T-score, an X-square value, a logarithmic likelihood ratio or the like. Further, the following may be performed: with reference to the contents stored in the contents storage unit 101, for each of the associated word search word and the associated word candidate words selected by the word selection unit 105, the association degree calculation unit 106 resolves the text before and after the word into morphemes and words, generates a vector having, as its elements, the presence or absence of morphemes and words, the number of occurrences, and a tf·idf value which is the frequency of occurrence (tf value) multiplied by an idf (inverse document frequency) value, and calculates as the association degree the reciprocal of the cosine distance or the Euclidean distance between the vector of the associated word search word and the vector of each associated word candidate word.

The input unit 107 includes input devices such as a keyboard, a mouse and a remote control unit, and with this, the user inputs search criteria including search keywords and input data.

The association search unit 108 is a processing unit that obtains, from the association dictionary storage unit 102, the associated words associated with the search criterion inputted from the contents storage unit 101 and the search keyword included in the search criterion and generates an extended search criterion, obtains the contents matching the extended search criterion from the contents storage unit 101, and outputs it as the search result. The association search unit 108 is provided with a search criterion generation unit 109 and a search unit 110.

The search criterion generation unit 109 obtains, from the association dictionary storage unit 102, the associated word associated with the search keyword included in the search criterion inputted from the input unit 107 by an association degree not less than a predetermined threshold value, and generates an extended search criterion from the obtained associated word and the search keyword.

The search unit 110 obtains the contents matching the search criterion generated by the search criterion generation unit 109 from the contents storage unit 101, and sets them as the search result.

Figure 4:
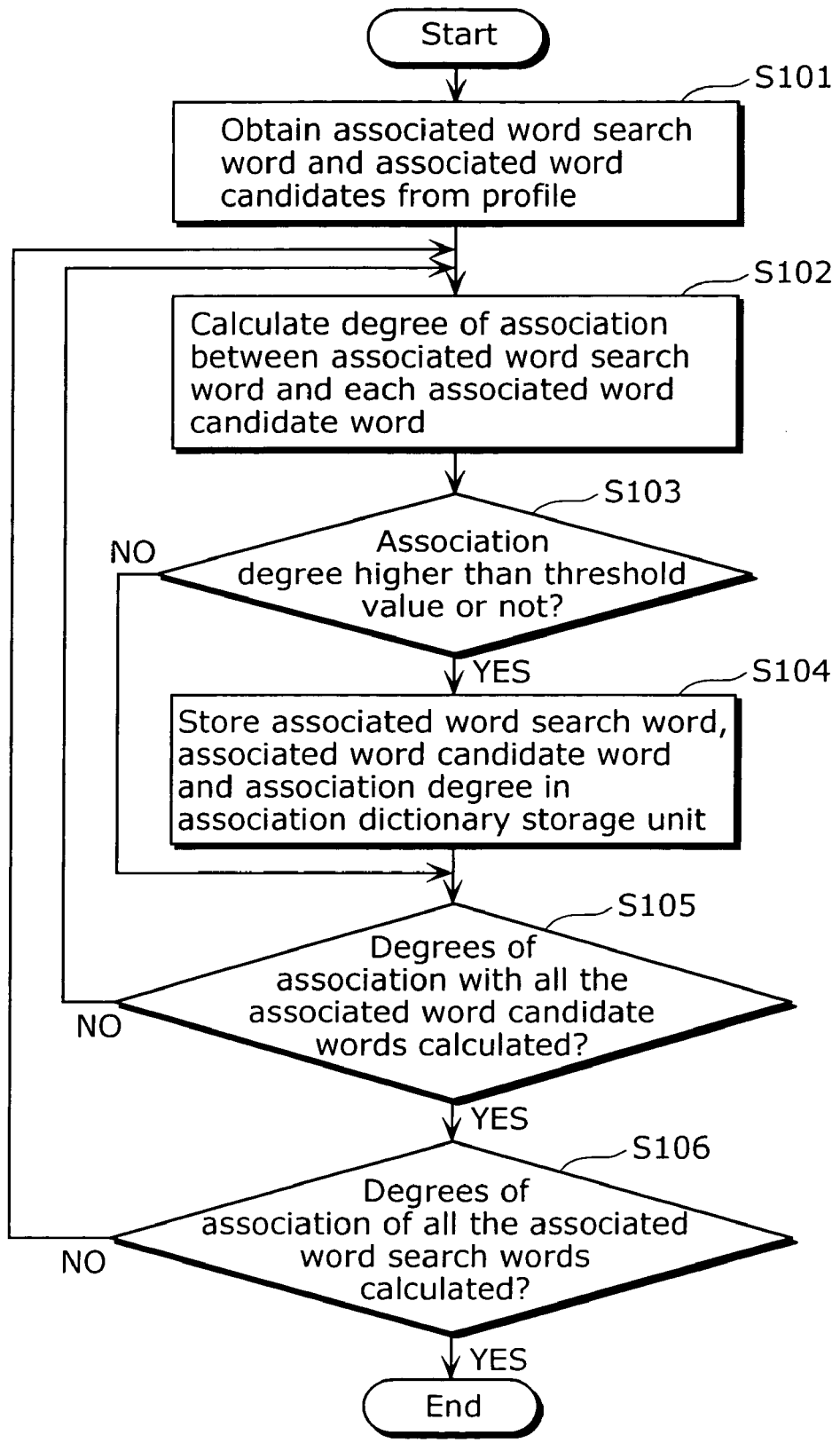
FIG. 4 is a flowchart showing the flow of the operation of creating an association dictionary in the information search apparatus according to the first embodiment.

An example of the operation of creating an association dictionary in the thus structured information search apparatus according to the present embodiment will be described. FIG. 4 is a flowchart showing the flow of the operation of creating an association dictionary.

The word selection unit 105 selects a word from the profile stored in the profile storage unit 104 every predetermined time and sets it as the associated word search word, and further, selects words other than the associated word search word included in the profile as the associated word candidates (step S101). As a concrete example, the word selection unit 105 sets words "Taro Matsushita, Jiro Matsushita, . . . " as the associated word search words from the profile of FIG. 3 stored in the profile storage unit 104 every week as the predetermined time; further, for the associated word search word "Taro Matsushita", the word selection unit 105 sets words "Jiro Matsushita, Saburo Matsushita, Hanako Matsushita, drama, 12:00-13:00, . . . " other than "Taro Matsushita" included in the profile of FIG. 3 as the associated word candidates and selects associated word candidates also for the other associated word search words "Jiro Matsushita, Saburo Matsushita, . . . . "

The association degree calculation unit 106 calculates the degree of association between the associated word search word selected by the word selection unit 105 and each associated word candidate word with reference to the contents stored in the contents storage unit 101 (step S102), and determines whether the association degree is higher than a predetermined threshold value or not (step S103). When the association degree is higher than the predetermined threshold value (YES of step S103), the associated word search word and the associated word candidate word are set as an associated word pair, and this associated word pair and the association degree are stored in the association dictionary storage unit 102 so as to be associated with each other (step S104). On the other hand, when the association degree is not more than the predetermined threshold value (NO of step S103), no processing is performed. These processings (steps S102 to S104) are performed for all the words included in the associated word candidates (step S105), and further, these processings (steps S102 to S105) are performed for all the associated word search words (step S106). In the above-described example, with reference to the contents stored in the contents storage unit 101, the association degree calculation unit 106 calculates the degree of association between each of the associated word search words "Taro Matsushita, Jiro Matsushita, . . . " selected by the word selection unit 105 and each of the associated word candidate words "Jiro Matsushita, Saburo Matsushita, Hanako Matsushita, drama, 12:00-13:00, . . . ", "Taro Matsushita, Saburo Matsushita, Hanako Matsushita, drama, 12:00-13:00, . . . ", . . . As an example, as the (associated word search word, associated word candidate word, association degree), the following are calculated: (Taro Matsushita, Jiro Matsushita, 80), (Taro Matsushita, Saburo Matsushita, 40), (Taro Matsushita, Hanako Matsushita, 70), (Taro Matsushita, drama, 20), (Taro Matsushita, 12:00-13:00, 30), (Jiro Matsushita, Taro Matsushita, 80), (Jiro Matsushita, Saburo Matsushita, 80), (Jiro Matsushita, Hanako Matsushita, 90), (Jiro Matsushita, drama, 10), (Jiro Matsushita, 12:00-13:00, 40), . . . , and the (associated word search word, associated word candidate word, association degree) the association degree of which is higher than the predetermined threshold value (as an example, 50) is stored in the association dictionary storage unit 102. The details of the association dictionary storage unit 102 in this case are as shown in FIG. 2.

Figure 5:
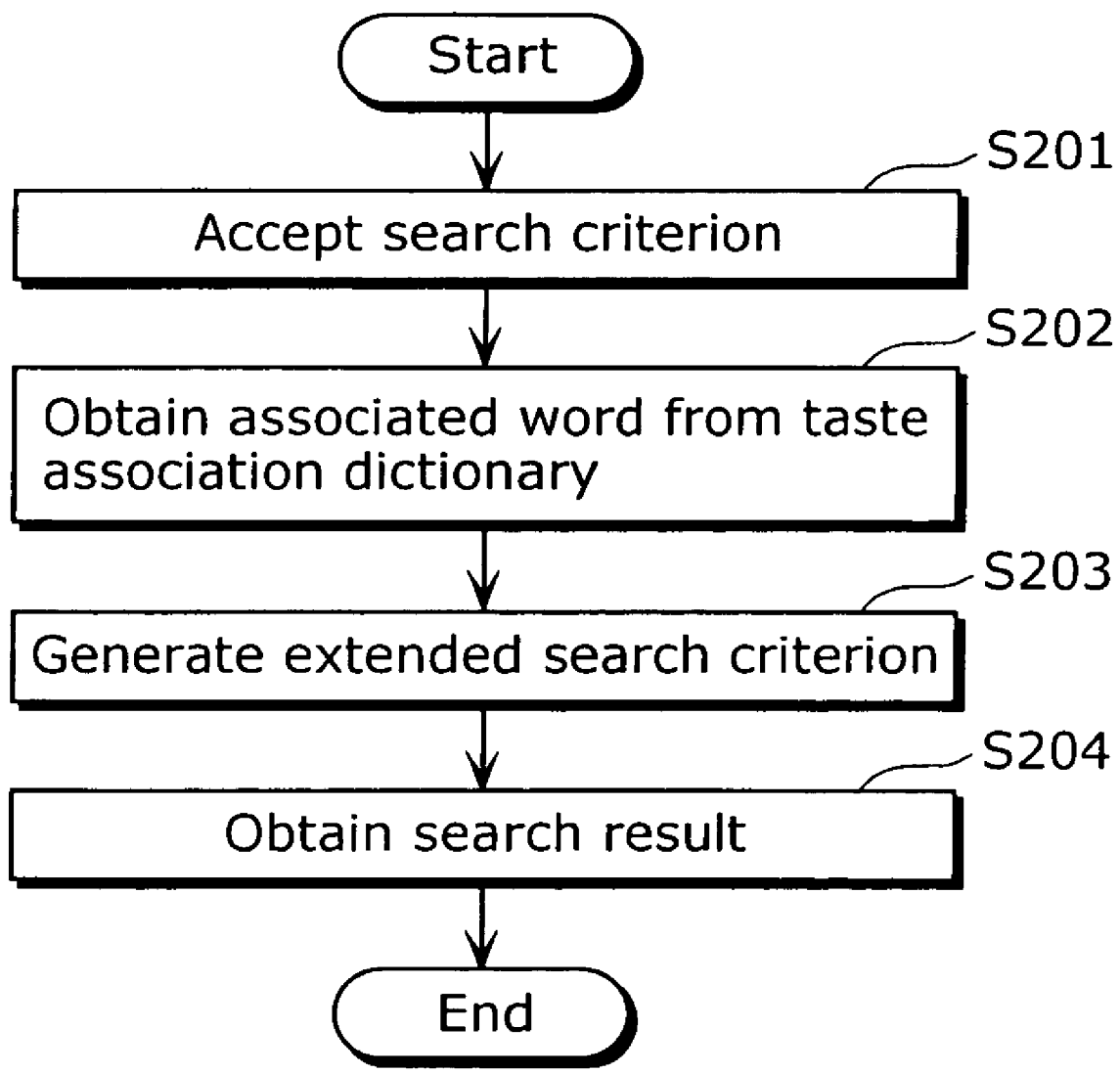
FIG. 5 is a flowchart showing the flow of the operation of searching information in the information search apparatus according to the first embodiment.

Next, an example of the operation of searching information in the information search apparatus according to the present embodiment will be described. FIG. 5 is a flowchart showing the flow of the operation of searching information.

The search criterion generation unit 109 accepts the search criterion inputted by the user from the input unit 107 (step S201). In the above-described example, it is assumed that a search criterion "programs of Taro Matsushita" is inputted by the user from the input unit 107 as an example.

Then, the search criterion generation unit 109 obtains, from the association dictionary storage unit 102, the associated word associated with the search keywords included in the search criterion inputted from the contents storage unit 101 by an association degree higher than the predetermined threshold value (step S202). Then, the search criterion generation unit 109 generates the extended search criterion from the obtained associated word and the search keyword (step S203). In the above-described embodiment, the search criterion generation unit 109 obtains, from the association dictionary storage unit 102, the associated word "Jiro Matsushita" associated with the search keyword "Taro Matsushita" included in the search criterion "programs of Taro Matsushita" inputted from the contents storage unit 101 by an association degree higher than the predetermined threshold value (as an example, the predetermined threshold value is 75), and generates an extended search criterion "Taro Matsushita+Jiro Matsushita" representing that either the obtained associated word "Jiro Matsushita" or the search keyword "Taro Matsushita" is included.

The search unit 110 obtains the contents matching the search criterion generated by the search criterion generation unit 109 from the contents storage unit 101, and sets them as the search result (step S204). In the above-described example, based on the search criterion "Taro Matsushita+Jiro Matsushita" generated by the search criterion generation unit 109, the search unit 110 obtains the contents including either of the keywords "Taro Matsushita" and "Jiro Matsushita" from the contents storage unit 101, and sets them as the search result.

While in the present embodiment, the word selection unit 105 selects the associated word search word and the associated word candidates from the profile stored in the profile storage unit 104 every predetermined time, it may select the associated word search word and the associated word candidates every time the profile is updated instead of every predetermined time. By doing this, the associated word pair can be obtained without any time lag from changes of the user's taste.

While in the present embodiment, the association degree calculation unit 106 calculates the association degree for the associated word search word selected by the word selection unit 105 and all the associated word candidate words and when the association degree is higher than the predetermined threshold value, sets the associated word search word and the associated word candidate word as the associated word pair and stores the associated word pair and the association degree in the association dictionary storage unit 102 so as to be associated with each other, the present invention is not limited thereto. For example, when the association degree calculation unit 106 newly calculates the associated word pair selected by the word selection unit 105 and its association degree, in a case where an associated word pair the same as the associated word pair the association degree of which is newly calculated is already present in the association dictionary storage unit 102 after all the association degrees stored in the association dictionary storage unit 102 is attenuated, the association degree already stored in the association dictionary storage unit 102 and the association degree newly obtained by the association degree calculation unit 106 may be added together for update. In this case, when (Taro Matsushita, Jiro Matsushita, 60) is newly calculated as the (associated word search word, associated word candidate word, association degree) by the association degree calculation unit 106, the association degree stored in the association dictionary storage unit 102 shown in FIG. 2 is attenuated by being multiplied by an attenuation parameter (as an example, 0.8), and a value 124 obtained by adding the newly obtained association degree 60 to the attenuated association value 64 of the already present associated pair (Taro Matsushita, Jiro Matsushita) is stored in the association dictionary storage unit 102 as the association degree of the associated word pair (Taro Matsushita, Jiro Matsushita). Consequently, the details of the association dictionary storage unit 102 are updated as shown in FIG. 6. By doing this, the association degree considering the association degree for the past contents can be obtained, so that the accuracy of the association degree can be improved.

Moreover, for example, the following may be performed: The association degree is calculated for the associated word search word selected by the word selection unit 105 and all the associated word candidate words, the associated word search word and the associated word candidate word are set as the associated word pair irrespective of whether the association degree is higher than the predetermined threshold value or not, and the associated word pair and the association degree are stored in the association dictionary storage unit 102 so as to be associated with each other. By storing the associate word pair and the association degree in the association dictionary storage unit 102 so as to be associated with each other when the association degree is higher than the predetermined threshold value like in the present embodiment, the storage lo capacity can be suppressed.

As described above, according to the present embodiment, by selecting words to be stored in the association dictionary from the profile which is the information representative of the user's taste, an association dictionary storing only words suiting the user's taste can be created. Further, by the user using the created association dictionary when searching for contents, the search criterion can be extended by use of words suiting the user's taste.

(Second Embodiment)

Figure 7:
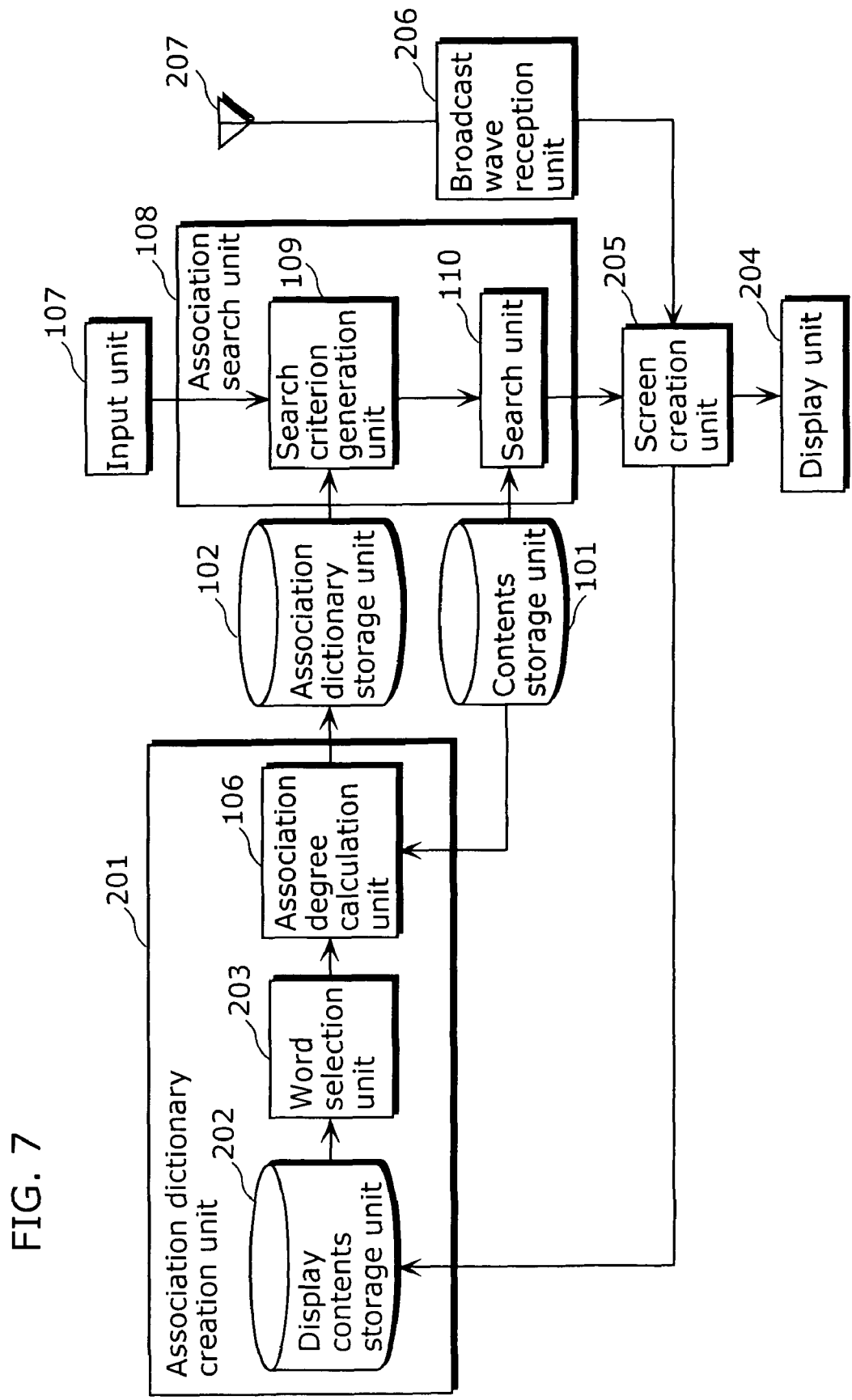
FIG. 7 is a block diagram showing the structure of an information search apparatus including an association dictionary creation apparatus according to a second embodiment of the present invention.

FIG. 7 is a block diagram showing the structure of an information search apparatus including an association dictionary creation apparatus according to a second embodiment of the present invention. Elements denoted by the same reference numerals as those of the first embodiment perform the same operations, and detailed descriptions thereof are omitted.

The information search apparatus of the present embodiment is for creating an association dictionary storing the association between words and performing information search by using the association dictionary, and as shown in FIG. 7, includes the contents storage unit 101, the association dictionary storage unit 102, the input unit 107, the association search unit 108, an association dictionary creation unit 201, a display unit 204, a screen creation unit 205 and a broadcast wave reception unit 206.

The display unit 204 is a CRT display, a liquid crystal display (LCD), a plasma display panel (PDP) or the like, and displays the inputted display screen information. The broadcast wave reception unit 206 receives contents such as television broadcast programs through an antenna 207.

The screen creation unit 205 converts the search result obtained by the search unit 110 into display screen information, outputs the display screen information to the display unit 204, and outputs to the display unit 204 contents such as television broadcast programs received by the broadcast wave reception unit 206. Further, the screen creation unit 205 extracts, as information regarding an on-screen display, text information regarding the search result obtained by the search unit 110 or information regarding contents such as television broadcast programs displayed on the display unit 204, and stores it in a display contents storage unit 202.

The association dictionary creation unit 201 is an association dictionary creation apparatus calculating, for the contents stored in the contents storage unit 101, the association degree of the word pair extracted from the displayed search result and storing the word pair that is the object of calculation and the calculated association degree in the association dictionary storage unit 102 so as to be associated with each other. The association dictionary creation unit 201 is provided with the display contents storage unit 202, a word selection unit 203 and the association degree calculation unit 106.

The display contents storage unit 202 stores information regarding the on-screen display which is text information regarding the displayed search result and information regarding the displayed contents. The word selection unit 203 extracts words by performing, every time new text information is stored in the display contents storage unit 202, morphological analysis and the like on the text information, selects a word from the extracted words and sets it as the associated word search word, and further, generates a plurality of pairs where the associated word candidates are the words other than the associated word search word of the extracted words.

The association degree calculation unit 106 calculates the degree of association between the associated word search word and each associated word candidate word selected by the word selection unit 203 with reference to the contents stored in the contents storage unit 101, and when the association degree is higher than a predetermined threshold value, the association degree calculation unit 106 sets the associated word search word and the associated word candidate word as the associated word pair, and stores the associated word pair and the association degree in the association dictionary storage unit 102 so as to be associated with each other. As the association degree calculation method, a method similar to that of the first embodiment is used.

Figure 8:
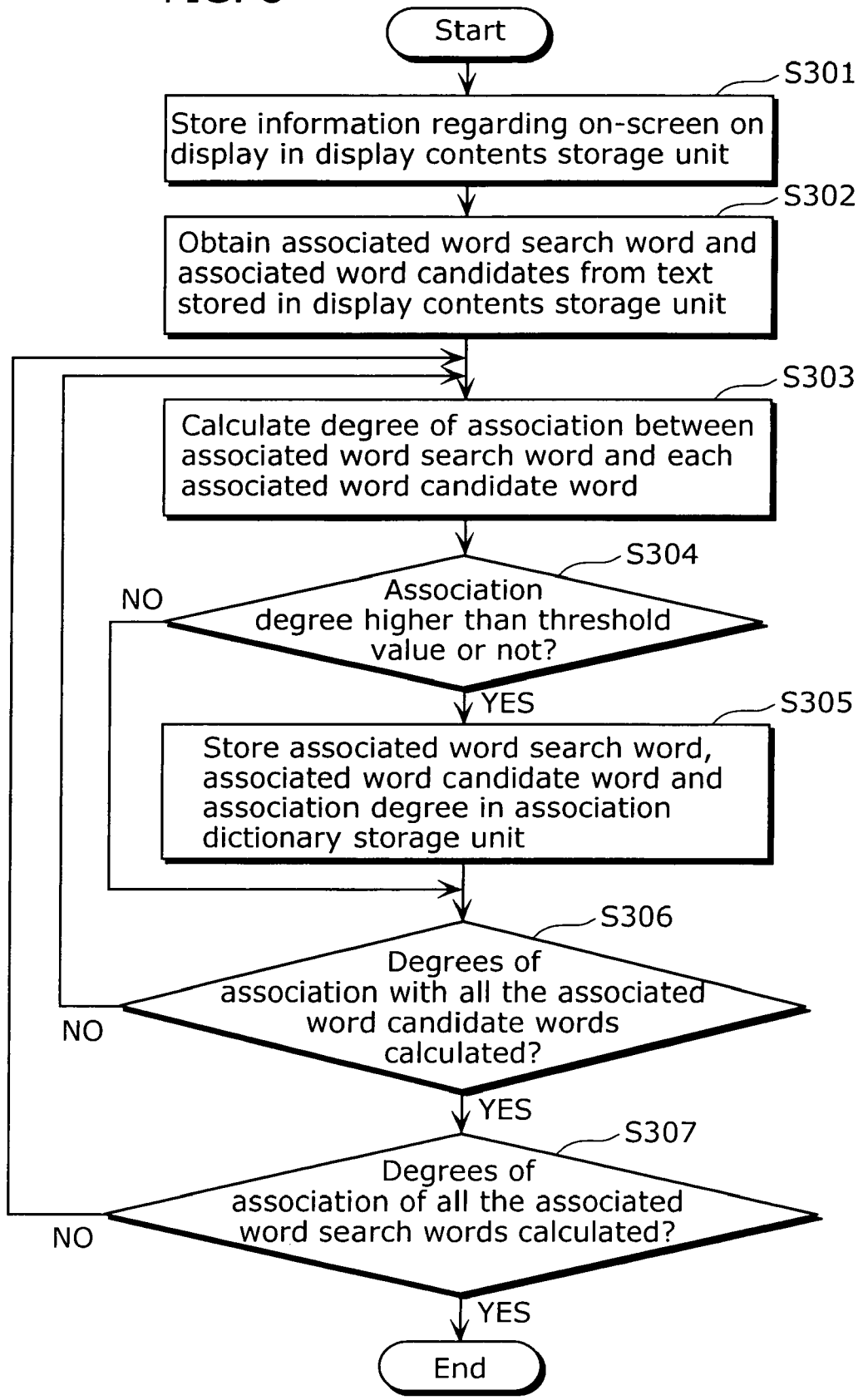
FIG. 8 is a flowchart showing the flow of the operation of creating an association dictionary in the information search apparatus according to the second embodiment.

An example of the operation of creating an association dictionary in the thus structured information search apparatus according to the present embodiment will be described. FIG. 8 is a flowchart showing the flow of the operation of creating an association dictionary.

Here, it is assumed that the screen creation unit 205 converts the search result obtained by the search unit 110 into the display screen information and outputs the display screen information to the display unit 204 or outputs the contents such as television broadcast programs received by the broadcast wave reception unit 206 to the display unit 204. As an example, when the search result is displayed, the user inputs a search criterion "programs of Taro Matsushita", and the search result is movie contents where Taro Matsushita appears and text "Cast: Taro Matsushita, Hanako Matsushita, Saburo Matsushita" that is the explanation of the movie contents. On the other hand, when the contents such as television broadcast programs are displayed, the contents having "Cast: Jiro Matsushita, Hanayo Matsushita" is displayed as the text information regarding the contents.

First, as the information regarding the on-screen display, the screen creation unit 205 stores, in the display contents storage unit 202, the text information regarding the search result when the search result obtained by the search unit 110 is displayed, and stores therein the text information regarding the contents when the contents received by the broadcast wave reception unit 206 are displayed (step S301). When the contents received by the broadcast wave reception unit 206 are displayed, if they are displayed for not less than a predetermined time (for example, 10 minutes), the text information regarding the contents may be stored in the display contents storage unit 202. In the case where the search result is displayed in the above-mentioned example, the screen creation unit 205 stores, in the display contents storage unit 202, the text "Cast: Taro Matsushita, Hanako Matsushita, Saburo Matsushita" that is the explanation of the movie contents where Taro Matsushita appears searched for by the search unit 110. In the case where the contents received by the broadcast wave reception unit 206 are displayed in the above-mentioned example, "Cast: Jiro Matsushita, Hanayo Matsushita" is stored in the display contents storage unit 202.

When the text information is stored in the display contents storage unit 202 from the screen creation unit 205, the word selection unit 203 performs morphological analysis and the like on the text information to thereby extract words, selects a word from the extracted words and sets it as the associated word search word, and further, generates a plurality of pairs where the associated word candidates are the words other than the associated word search word of the extracted words (step S302). For example, when the text "Cast: Taro Matsushita, Hanako Matsushita, Saburo Matsushita" is stored in the display contents storage unit 202, the word selection unit 203 performs morphological analysis on "Cast: Taro Matsushita, Hanako Matsushita, Saburo Matsushita" to thereby extract, for example, words "Taro Matsushita, Hanako Matsushita, Saburo Matsushita" representative of names, and generates (Taro Matsushita, (Hanako Matsushita, Saburo Matsushita)), (Hanako Matsushita, (Taro Matsushita, Saburo Matsushita)) and (Saburo Matsushita, (Taro Matsushita, Hanako Matsushita)) as the (associated word search word, (associated word candidate)).

The association degree calculation unit 106 calculates the degree of association between the associated word search word selected by the word selection unit 105 and each associated word candidate word with reference to the contents stored in the contents storage unit 101 (step S303), and determines whether the association degree is higher than a predetermined threshold value or not (step S304). When the association degree is higher than the predetermined threshold value (YES of step S304), the associated word search word and the associated word candidate word are set as an associated word pair, and this associated word pair and the association degree are stored in the association dictionary storage unit 102 so as to be associated with each other (step S305). Here, the associated word pair the association degree of which is newly calculated overlaps since one word becomes the associated word search word in a case and becomes the associated word candidate word in another case, and this overlap is omitted before the associated word pairs are stored in the association dictionary storage unit 102. On the other hand, when the association degree is not more than the predetermined threshold value (NO of step S304), no processing is performed. These processings (steps S303 to S305) are performed for all the words included in the associated word candidates (step S306), and further, these processings (steps S303 to S306) are performed for all the associated word search words (step S307). In the above-described example, with reference to the contents stored in the contents storage unit 101, the association degree calculation unit 106 calculates the degree of association between the associated word search word and each associated word candidate word for each of (Taro Matsushita, (Hanako Matsushita, Saburo Matsushita)), (Hanako Matsushita, (Taro Matsushita, Saburo Matsushita)) and (Saburo Matsushita, (Taro Matsushita, Hanako Matsushita)) which are pairs of (associated word search word, (associated word candidate)) selected by the word selection unit 105. As an example, as the (associated word search word, associated word candidate word, association degree), (Taro Matsushita, Hanako Matsushita, 60), (Taro Matsushita, Saburo Matsushita, 40), (Hanako Matsushita, Taro Matsushita, 60), (Hanako Matsushita, Saburo Matsushita, 70), (Saburo Matsushita, Taro Matsushita, 40) and (Saburo Matsushita, Hanako Matsushita, 70) are calculated, and the (associated word search word, associated word candidate word, association degree) the association degree of which is higher than the predetermined threshold value (as an example, 50) is added to the association dictionary storage unit 102 where the association degree stored in the association dictionary storage unit 102 shown in FIG. 2 has been attenuated by being multiplied by an attenuation parameter (as an example, 0.8). The details of the association dictionary storage unit 102 in this case are as shown in FIG. 9.

While in the present embodiment, when the association dictionary storage unit 102 is updated, in a case where an associated word pair the same as the associated word pair the association degree of which is newly calculated is already present in the association dictionary storage unit 102 after all the association degrees stored in the association dictionary storage unit 102 are attenuated, the association degree calculation unit 106 updates the association dictionary storage unit 102 by adding the association degrees already stored in the association dictionary storage unit 102 to the association degrees newly obtained by the association degree calculation unit 106, the present invention is not limited thereto. For example, the association degree calculation unit 106 may store the associated word pair, the association degree of which is newly calculated, as it is in the association dictionary storage unit 102 so as to be associated with the association degree.

While movie contents are searched for in the present embodiment, the present invention is not limited thereto. Hypertext or web pages on the Internet may be searched for. In this case, the screen creation unit 205 stores, in the display contents storage unit 202, the display text of the hypertext or the web page searched for by the search unit 110, and further, converts the hypertext or the text of the web page that is searched for into display screen information and outputs the display screen information to the display unit 204. As a concrete example, when a file "name.html" described in the HTML shown in FIG. 10 is searched for by the search unit 110, the screen creation unit 205 stores, in the display contents storage unit 202, the display text "Taro Matsushita, Hanako Matsushita, Saburo Matsushita, Jiro Matsushita" shown in FIG. 11B from the file "name.html", and further, converts the file "name.html" into display screen information and outputs the display screen information to the display unit 204 as shown in FIG. 11A. Further, the screen creation unit 205 may store only the displayed text in the display contents storage unit 202 when none of the text is displayed on the display unit 204. In the above-described embodiment, as an example, when the file "name.html" described in the HTML of FIG. 10 is displayed on the display unit as shown in FIG. 12A, the screen creation unit 205 stores only the display text "Taro Matsushita, Hanako Matsushita, Saburo Matsushita" in the display contents storage unit 202 as shown in FIG. 12B. By doing this, the association dictionary can be created only from the words extracted from the text of the contents watched by the user, so that an association dictionary adapted to the user's watching behavior can be created. Moreover, the screen creation unit 205 may treat the text displayed on the display unit 204 for not less than a predetermined time, as the displayed text. By doing this, the text that is merely displayed at the time of scrolling and is not watched by the user can be excluded.

While the screen creation unit 205 stores the text information regarding the contents searched for by the search unit 110 in the display contents storage unit 202, when the contents are movie contents and corresponding text is present for each scene or frame of the movie contents, the screen creation unit 205 may store only the text corresponding to the scenes or frames of the movie contents watched by the user in the display contents storage unit 202. By doing this, the association dictionary can be created only from the text corresponding to the scenes or frames of the movie contents watched by the user, so that a highly accurate association dictionary adapted to the user's watching behavior can be created for movie contents.

As described above, according to the present embodiment, by selecting the words to be stored in the association dictionary from the text on the contents watched by the user, an association dictionary adapted to the user's watching behavior can be created. Further, when the user searches for the contents, by using the created association dictionary, the search criterion can be extended by use of words fit for the user's watching behavior. Consequently, the extended search result can be adapted to the user's watching behavior.

(Third Embodiment)

Figure 13:
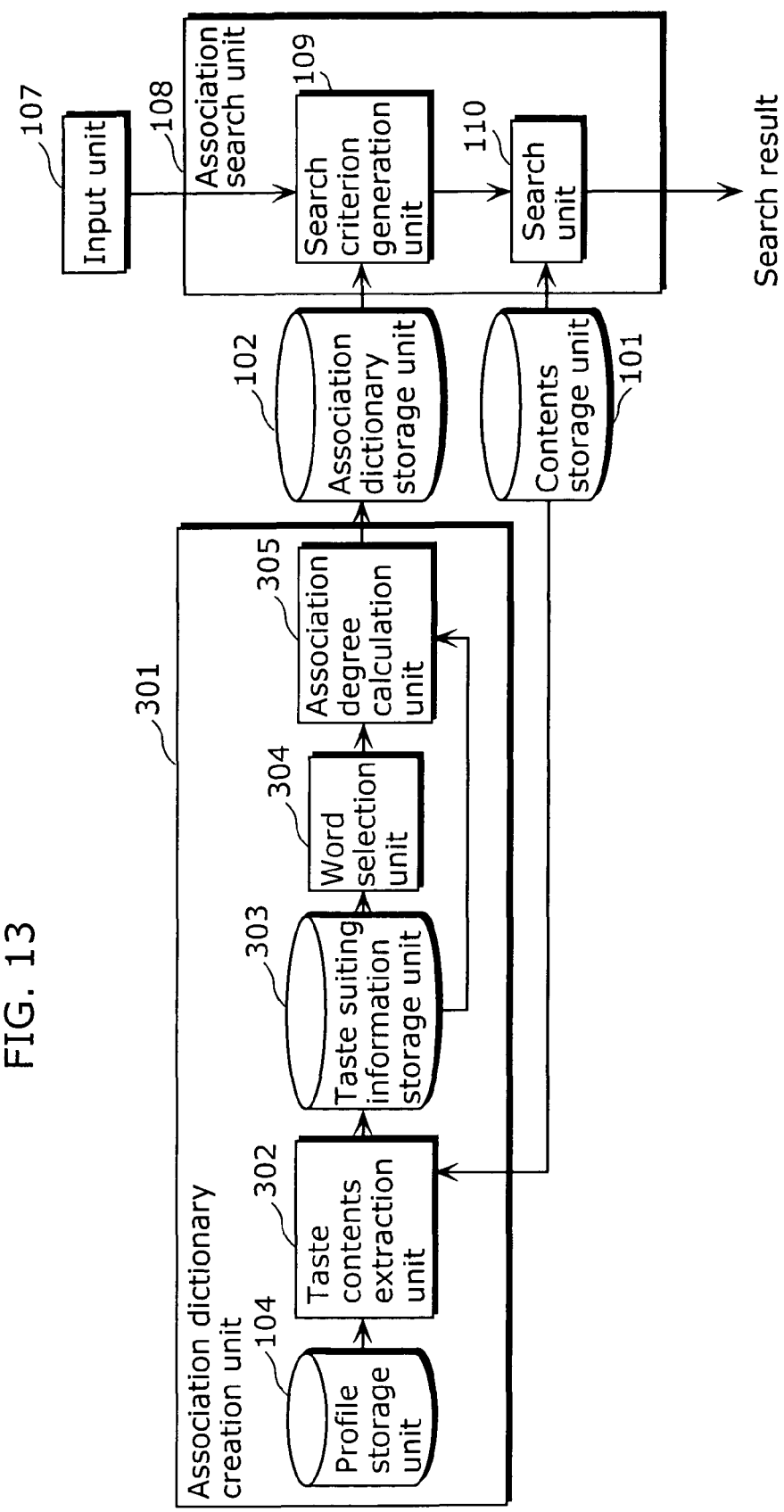
FIG. 13 is a block diagram showing the structure of an information search apparatus including an association dictionary creation apparatus according to a third embodiment of the present invention.

FIG. 13 is a block diagram showing the structure of an information search apparatus including an association dictionary creation apparatus according to a third embodiment of the present invention. Elements denoted by the same reference numerals as those of the first embodiment perform the same operations, and detailed descriptions thereof are omitted.

The information search apparatus of the present embodiment is for creating an association dictionary storing the association between words and performing information search by using the association dictionary, and as shown in FIG. 13, includes the contents storage unit 101, the association dictionary storage unit 102, the input unit 107, the association search unit 108, and an association dictionary creation unit 301.

The association dictionary creation unit 301 is an association dictionary creation apparatus that extracts taste suiting information as the text on the contents suiting the user's taste from the contents stored in the contents storage unit 101 and further, for the taste suiting information, calculates the association degree of the associated word pair extracted from the taste suiting information and stores the word pair that is the object of calculation and the calculated association degree in the association dictionary storage unit 102 so as to be associated with each other. The association dictionary creation unit 301 is provided with the profile storage unit 104, a taste contents extraction unit 302, a taste suiting information storage unit 303, a word selection unit 304, and an association degree calculation unit 305.

The taste suiting information storage unit 303 stores the taste suiting information which is the text on the contents suiting the user's taste. The taste contents extraction unit 302 extracts the taste suiting information which is the text on the contents suiting the user's taste from the contents stored in the contents storage unit 101 by using the profile which is the information regarding the user's taste stored in the profile storage unit 104, and stores it in the taste suiting information storage unit 303.

The word selection unit 304 performs morphological analysis and the like on the taste suiting information stored in the taste suiting information storage unit 303 to thereby extract words, selects a word from the extracted words and sets it as the associated word search word, and further, generates a plurality of pairs where the associated word candidates are the words other than the associated word search word of the extracted words.

The association degree calculation unit 305 calculates the degree of association between the associated word search word and each associated word candidate word selected by the word selection unit 304 with reference to the taste suiting information stored in the taste suiting information storage unit 303, and when the association degree is higher than a predetermined threshold value, the association degree calculation unit 305 sets the associated word search word and the associated word candidate word as the associated word pair, and stores the associated word pair and the association degree in the association dictionary storage unit 102 so as to be associated with each other. As the association degree calculation method, a method similar to that of the first embodiment is used.

Figure 14:
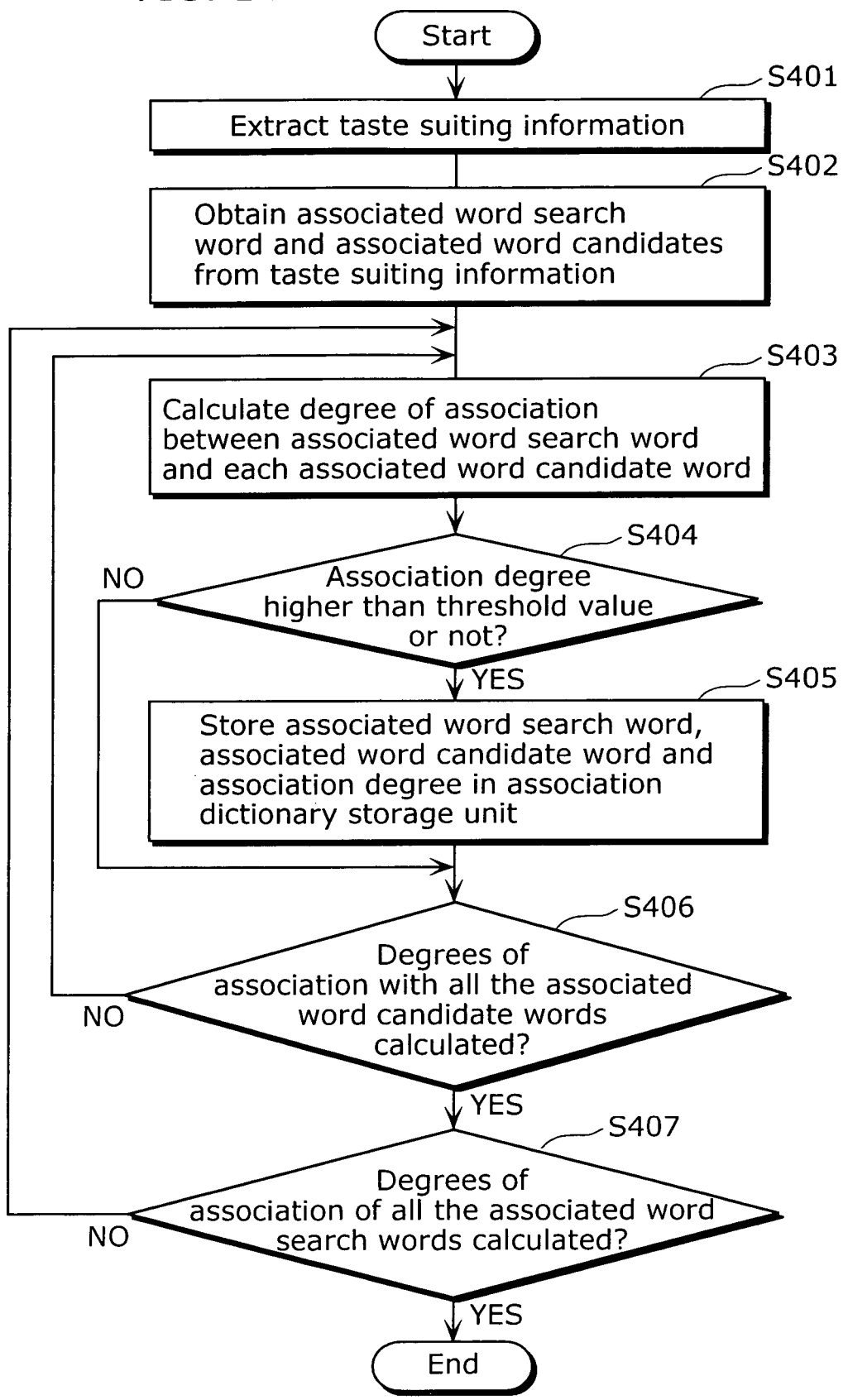
FIG. 14 is a flowchart showing the flow of the operation of creating an association dictionary in the information search apparatus according to the third embodiment.

An example of the operation of creating an association dictionary in the thus structured information search apparatus according to the present embodiment will be described. FIG. 14 is a flowchart showing the flow of the operation of creating an association dictionary.

The taste contents extraction unit 302 extracts the taste suiting information which is the text on the contents suiting the user's taste from the contents stored in the contents storage unit 101 by using, for example, the profile as shown in FIG. 3 stored in the profile storage unit 104, and stores it in the taste suiting information storage unit 303 (step S401). As a concrete example, the taste contents extraction unit 302 obtains (label, data, weight value) from the profile storage unit 104, and to the text on each of the contents stored in the contents storage unit 101, when the keyword of the data is included in the text, the taste contents extraction unit 302 adds the weight for the keyword and when the result of the addition exceeds a predetermined threshold value, stores the text exceeding the threshold value in the taste suiting information storage unit 303. As an example, the taste contents extraction unit 302 extracts the text "Genre: Drama, Cast: Taro Matsushita, Hanako Matsushita, Saburo Matsushita" from the contents storage unit 101, and stores it in the taste suiting information storage unit 303 as the taste suiting information.

The word selection unit 304 performs morphological analysis and the like on the taste suiting information stored in the taste suiting information storage unit 303 to thereby extract words, selects a word from the extracted words and sets it as the associated word search word, and further, generates a plurality of pairs where the associated word candidates are the words other than the associated word search word of the extracted words (step S402). In the above-described example, the word selection unit 304 performs morphological analysis on the text "Genre: Drama, Cast: Taro Matsushita, Hanako Matsushita, Saburo Matsushita" stored in the taste suiting information storage unit 303 to thereby extract, for example, words "Taro Matsushita, Hanako Matsushita, Saburo Matsushita" representative of names, and generates (Taro Matsushita, (Hanako Matsushita, Saburo Matsushita)), (Hanako Matsushita, (Taro Matsushita, Saburo Matsushita)) and (Saburo Matsushita, (Taro Matsushita, Hanako Matsushita)) as the (associated word search word, (associated word candidate)).

The association degree calculation unit 305 calculates the degree of association between the associated word search word selected by the word selection unit 304 and each associated word candidate word with reference to the taste suiting information stored in the taste suiting information storage unit 303 (step S403), and determines whether the association degree is higher than a predetermined threshold value or not (step S404). When the association degree is higher than the predetermined threshold value (YES of step S404), the associated word search word and the associated word candidate word are set as an associated word pair, and this associated word pair and the association degree are stored in the association dictionary storage unit 102 so as to be associated with each other (step S405). Here, the associated word pair the association degree of which is newly calculated overlaps since one word becomes the associated word search word in a case and becomes the associated word candidate word in another case, and this overlap is omitted before the associated word pairs are stored in the association dictionary storage unit 102. On the other hand, when the association degree is not more than the predetermined threshold value (NO of step S404), no processing is performed. These processings (steps S403 to S405) are performed for all the words included in the associated word candidate (step S406), and further, these processings (steps S403 to S406) are performed for all the associated word search words (step S407). In the above-described example, with reference to the taste suiting information stored in the taste suiting information storage unit 303, the association degree calculation unit 305 calculates the degree of association between the associated word search word and each associated word candidate word for each of (Taro Matsushita, (Hanako Matsushita, Saburo Matsushita)), (Hanako Matsushita, (Taro Matsushita, Saburo Matsushita)) and (Saburo Matsushita, (Taro Matsushita, Hanako Matsushita)) which are pairs of (associated word search word, (associated word candidate)) selected by the word selection unit 304. As an example, as the (associated word search word, associated word candidate word, association degree), (Taro Matsushita, Hanako Matsushita, 60), (Taro Matsushita, Saburo Matsushita, 40), (Hanako Matsushita, Taro Matsushita), 60, (Hanako Matsushita, Saburo Matsushita, 70), (Saburo Matsushita, Taro Matsushita, 40) and (Saburo Matsushita, Hanako Matsushita, 70) are calculated, and the (associated word search word, associated word candidate word, association degree) the association degree of which is higher than the predetermined threshold value (as an example, 50) is stored in the association dictionary storage unit 102. The details of the association dictionary storage unit 102 in this case are as shown in FIG. 15.

Since the operation of searching for information is the same as that of the first embodiment, a detailed description thereof is omitted.

While in the present embodiment, the association degree calculation unit 305 calculates the association degree for the associated word search word selected by the word selection unit 304 and all the associated word candidate words and when the association degree is higher than the predetermined threshold value, sets the associated word search word and the associated word candidate word as the associated word pair and stores the associated word pair and the association degree in the association dictionary storage unit 102 so as to be associated with each other, the present invention is not limited thereto. For example, when the association degree calculation unit 305 newly calculates the associated word pair selected by the word selection unit 304 and its association degree, in a case where an associated word pair the same as the associated word pair the association degree of which is newly calculated is already present in the association dictionary storage unit 102 after all the association degrees stored in the association dictionary storage unit 102 is attenuated, the association degree already stored in the association dictionary storage unit 102 and the association degree newly obtained by the association degree calculation unit 305 may be added together for update. In this case, with reference to the taste suiting information stored in the taste suiting information storage unit 303, the association degree calculation unit 305 calculates the degree of association between the associated word search word and each associated word candidate word for each of (Taro Matsushita, (Hanako Matsushita, Saburo Matsushita)), (Hanako Matsushita, (Taro Matsushita, Saburo Matsushita)) and (Saburo Matsushita, (Taro Matsushita, Hanako Matsushita)) which are pairs of (associated word search word, (associated word candidate)) selected by the word selection unit 304. As an example, as the (associated word search word, associated word candidate word, association degree), (Taro Matsushita, Hanako Matsushita, 60), (Taro Matsushita, Saburo Matsushita, 40), (Hanako Matsushita, Taro Matsushita, 60), (Hanako Matsushita, Saburo Matsushita, 70), (Saburo Matsushita, Taro Matsushita, 40) and (Saburo Matsushita, Hanako Matsushita, 70) are calculated, and the (associated word search word, associated word candidate word, association degree) the association degree of which is higher than the predetermined threshold value (as an example, 50) is added to the association dictionary storage unit 102 where the association degree stored in the association dictionary storage unit 102 shown in FIG. 2 has been attenuated by being multiplied by an attenuation parameter (as an example, 0.8). The details of the association dictionary storage unit 102 in this case are as shown in FIG. 9. By doing this, the association degree considering the association degree for the past contents can be obtained, so that the accuracy of the association degree can be improved.

Figure 16:
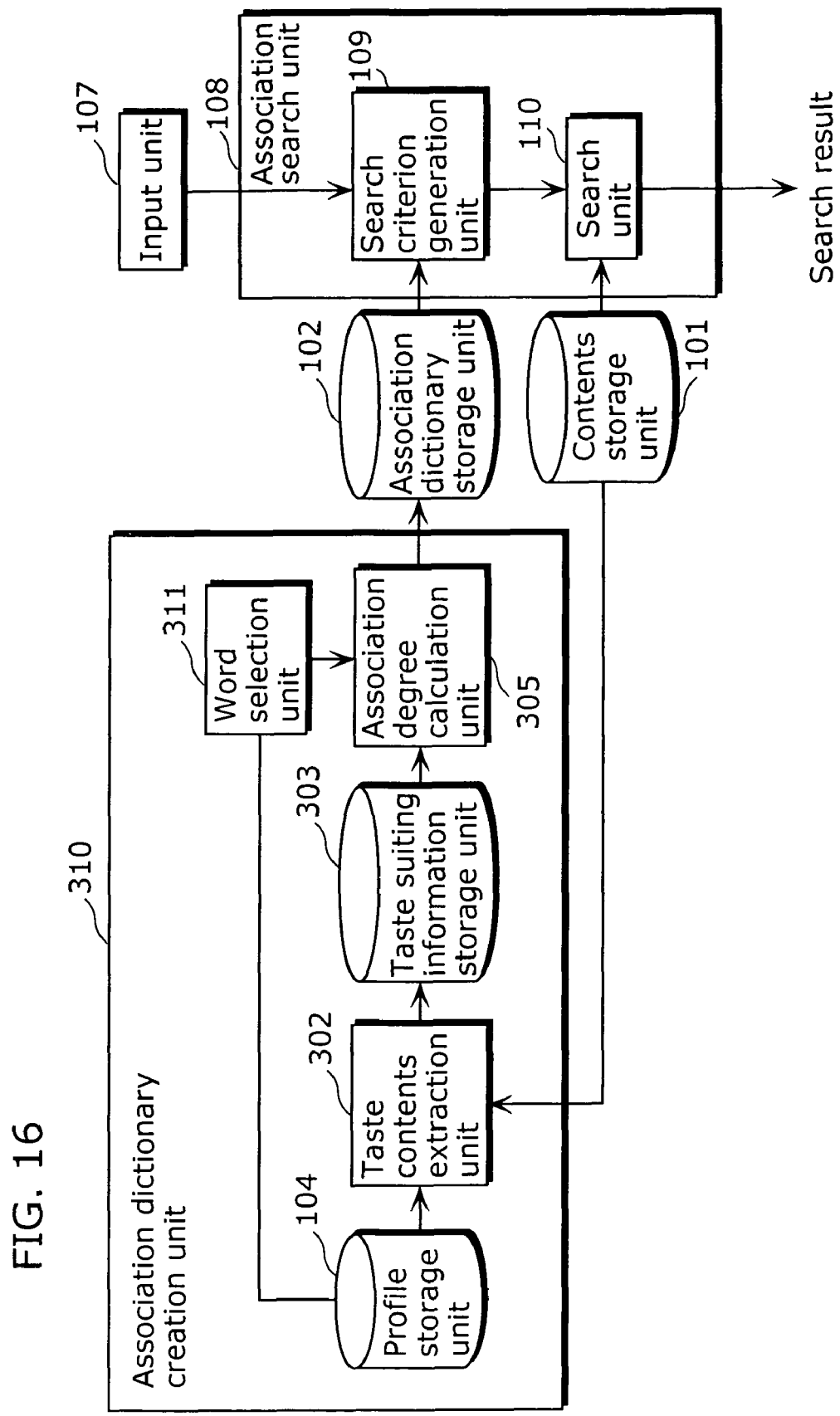
FIG. 16 is a block diagram showing another structure of the information search apparatus including the association dictionary creation apparatus according to the third embodiment.

Moreover, while in the present embodiment, the word selection unit 304 selects the associated word search word and the associated word candidate from the taste suiting information storage unit 303, for example as shown in FIG. 16, it may select the associated word search word and the associated word candidate from the profile storage unit 104 like in the first embodiment. Further, the associated word search word and the associated word candidate may be set for only pieces of data the weight value of which is not less than a predetermined threshold value. By doing this, only the data strongly reflecting the user's taste is stored in the association dictionary storage unit 102, so that the user's taste can be strongly reflected in the words stored in the association dictionary storage unit 102.

As described above, according to the present embodiment, by selecting the words to be stored in the association dictionary from the contents suiting the user's taste and calculating also the association degree, an association dictionary can be created in which only words suiting the user's taste are stored and the association degrees of the words are adapted to the user's taste. Further, when the user searches for the contents, by using the created association dictionary, the search criterion can be extended by performing association suiting the user's taste and using words suiting the user's taste. Consequently, the extended search result can be more adapted to the user's taste.

(Fourth Embodiment)

Figure 17:
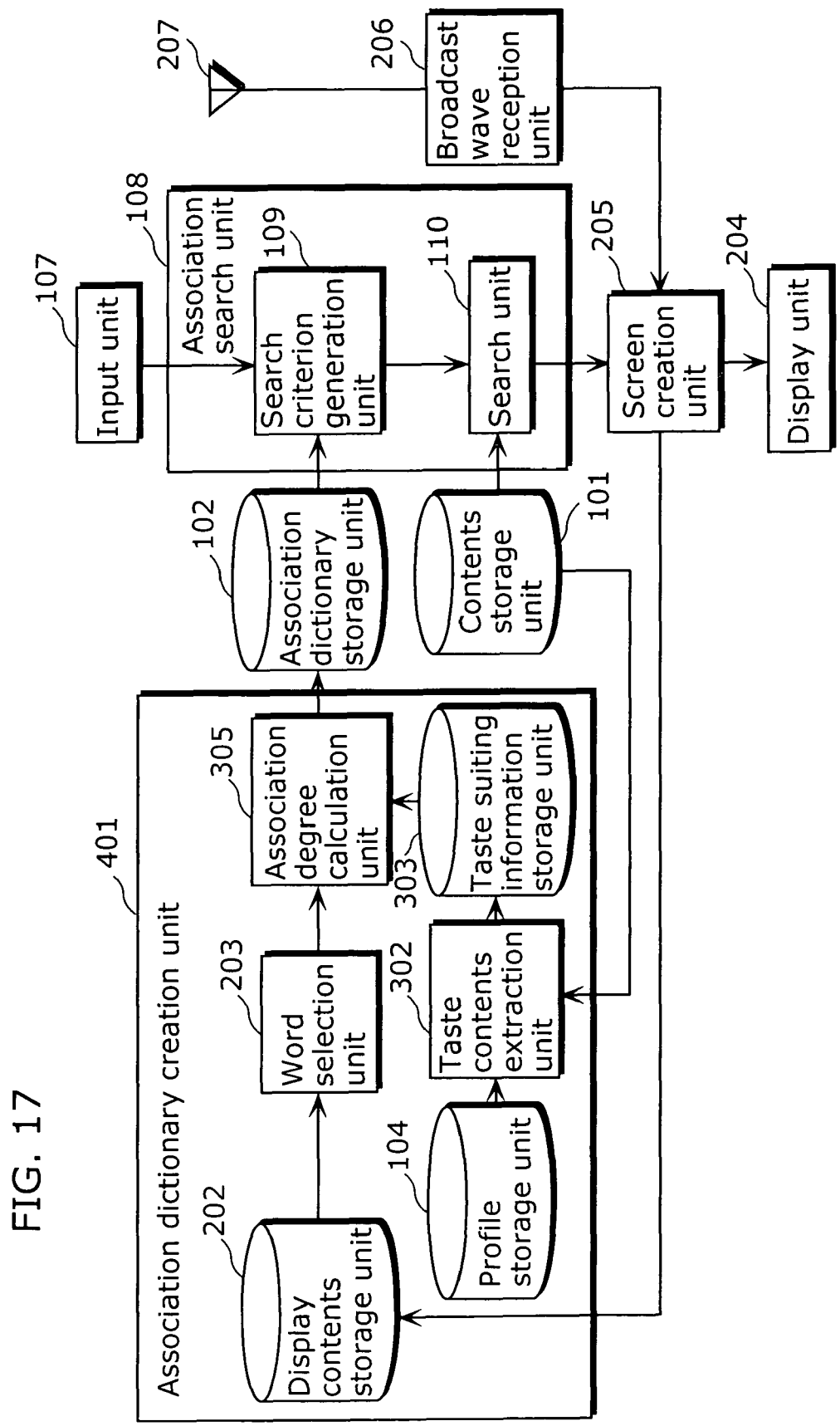
FIG. 17 is a block diagram showing the structure of an information search apparatus including an association dictionary creation apparatus according to a fourth embodiment of the present invention.

FIG. 17 is a block diagram showing the structure of an information search apparatus including an association dictionary creation apparatus according to a fourth embodiment of the present invention. Elements denoted by the same reference numerals as those of the first to third embodiments perform the same operations, and detailed descriptions thereof are omitted.

The information search apparatus of the present invention is for creating an association dictionary storing the association between words and performing information search by using the association dictionary, and as shown in FIG. 17, includes the contents storage unit 101, the association dictionary storage unit 102, the input unit 107, the association search unit 108, the display unit 204, the screen creation unit 205, the broadcast wave reception unit 206 and an association dictionary creation unit 401.

The association dictionary creation unit 401 is an association dictionary creation apparatus that extracts taste suiting information as the text on the contents suiting the user's taste from the contents stored in the contents storage unit 101 and further, for the taste suiting information, calculates the association degree of the associated word pair extracted from the displayed search result and stores the word pair that is the object of calculation and the calculated association degree in the association dictionary storage unit 102 so as to be associated with each other. The association dictionary creation unit 401 is provided with the profile storage unit 104, the taste contents extraction unit 302, the taste suiting information storage unit 303, the display contents storage unit 202, the word selection unit 203, and the association degree calculation unit 305.

The taste suiting information storage unit 303 stores the taste suiting information which is the text on the contents suiting the user's taste. The taste contents extraction unit 302 extracts the taste suiting information which is the text on the contents suiting the user's taste from the contents stored in the contents storage unit 101 by using the profile which is the information regarding the user's taste stored in the profile storage unit 104, and stores it in the taste suiting information storage unit 303.

The display contents storage unit 202 stores information regarding the on-screen display which is text information regarding the displayed search result and information regarding the displayed contents. The word selection unit 203 extracts words by performing, every time new text information is stored in the display contents storage unit 202, morphological analysis and the like on the text information, selects a word from the extracted words and sets it as the associated word search word, and further, generates a plurality of pairs where the associated word candidates are the words other than the associated word search word of the extracted words.

The association degree calculation unit 305 calculates the degree of association between the associated word search word and each associated word candidate word selected by the word selection unit 304 with reference to the taste suiting information stored in the taste suiting information storage unit 303, and when the association degree is higher than a predetermined threshold value, the association degree calculation unit 305 sets the associated word search word and the associated word candidate word as the associated word pair, and stores the associated word pair and the association degree in the association dictionary storage unit 102 so as to be associated with each other. As the association degree calculation method, a method similar to that of the first embodiment is used.

An example of the operation of creating an association dictionary in the thus structured information search apparatus according to the present embodiment will be described. FIG. 18 is a flowchart showing the flow of the operation of creating an association dictionary.

Here, it is assumed that the screen creation unit 205 converts the search result obtained by the search unit 110 into the display screen information and outputs the display screen information to the display unit 204 or outputs contents such as television broadcast programs received by the broadcast wave reception unit 206 to the display unit 204 like in the second embodiment. As an example, when the search result is displayed, the user inputs a search criterion "programs of Taro Matsushita", and the search result is movie contents where Taro Matsushita appears and text "Cast: Taro Matsushita, Hanako Matsushita, Saburo Matsushita" that is the explanation of the movie contents. On the other hand, when contents such as television broadcast programs are displayed, contents having "Cast: Jiro Matsushita, Hanayo Matsushita" is displayed as the text information regarding the contents.

First, like in the second embodiment, as the information regarding the on-screen display, the screen creation unit 205 stores, in the display contents storage unit 202, the text information regarding the search result when the search result obtained by the search unit 110 is displayed, and stores therein the text information regarding the contents when the contents received by the broadcast wave reception unit 206 is displayed (step S501). When the contents received by the broadcast wave reception unit 206 are displayed, if they are displayed for not less than a predetermined time (for example, 10 minutes), the text information regarding the contents may be stored in the display contents storage unit 202. In the case where the search result is displayed in the above-mentioned example, the screen creation unit 205 stores, in the display contents storage unit 202, the text "Cast: Taro Matsushita, Hanako Matsushita, Saburo Matsushita" that is the explanation of the movie contents where Taro Matsushita appears searched for by the search unit 110. In the case where the contents received by the broadcast wave reception unit 206 are displayed in the above-mentioned example, "Cast: Jiro Matsushita, Hanayo Matsushita" is stored in the display contents storage unit 202.

Then, like in the third embodiment, the taste contents extraction unit 302 extracts the taste suiting information which is the text on the contents suiting the user's taste from the contents stored in the contents storage unit 101 by using, for example, the profile as shown in FIG. 3 stored in the profile storage unit 104, and stores it in the taste suiting information storage unit 303 (step S502). As a concrete example, the taste contents extraction unit 302 obtains (label, data, weight value) from the profile storage unit 104, and to the text on each of the contents stored in the contents storage unit 101, when the keyword of the data is included in the text, the taste contents extraction unit 302 adds the weight for the keyword and when the result of the addition exceeds a predetermined threshold value, stores the text exceeding the threshold value in the taste suiting information storage unit 303. As an example, the taste contents extraction unit 302 extracts the text "Genre: Drama, Cast: Taro Matsushita, Hanako Matsushita, Saburo Matsushita" from the contents storage unit 101, and stores it in the taste suiting information storage unit 303 as the taste suiting information.

When the text information is stored in the display contents storage unit 202 from the screen creation unit 205, the word selection unit 203 performs morphological analysis and the like on the text information to thereby extract words, selects a word from the extracted words and sets it as the associated word search word, and further, generates a plurality of pairs where the associated word candidates are the words other than the associated word search word of the extracted words (step S503). For example, when the text "Cast: Taro Matsushita, Hanako Matsushita, Saburo Matsushita" is stored in the display contents storage unit 202, the word selection unit 203 performs morphological analysis on "Cast: Taro Matsushita, Hanako Matsushita, Saburo Matsushita" to thereby extract, for example, words "Taro Matsushita, Hanako Matsushita, Saburo Matsushita" representative of names, and generates (Taro Matsushita, (Hanako Matsushita, Saburo Matsushita)), (Hanako Matsushita, (Taro Matsushita, Saburo Matsushita)) and (Saburo Matsushita, (Taro Matsushita, Hanako Matsushita)) as the (associated word search word, (associated word candidate)).

The association degree calculation unit 305 calculates the degree of association between the associated word search word selected by the word selection unit 203 and each associated word candidate word with reference to the taste suiting information stored in the taste suiting information storage unit 303 (step S504), and determines whether the association degree is higher than a predetermined threshold value or not (step S505). When the association degree is higher than the predetermined threshold value (YES of step S505), the associated word search word and the associated word candidate word are set as an associated word pair, and this associated word pair and the association degree are stored in the association dictionary storage unit 102 so as to be associated with each other (step S506). Here, the associated word pair the association degree of which is newly calculated overlaps since one word becomes the associated word search word in a case and becomes the associated word candidate word in another case, and this overlap is omitted before the associated word pairs are stored in the association dictionary storage unit 102. On the other hand, when the association degree is not more than the predetermined threshold value (NO of step S505), no processing is performed. These processings (steps S504 to S506) are performed for all the words included in the associated word candidate (step S507), and further, these processings (steps S504 to S507) are performed for all the associated word search words (step S508).

In the above-described example, with reference to the taste suiting information stored in the taste suiting information storage unit 303, the association degree calculation unit 305 calculates the degree of association between the associated word search word and the associated word candidate word for each of (Taro Matsushita, (Hanako Matsushita, Saburo Matsushita)), (Hanako Matsushita, (Taro Matsushita, Saburo Matsushita)) and (Saburo Matsushita, (Taro Matsushita, Hanako Matsushita)) which are pairs of (associated word search word, (associated word candidate)) selected by the word selection unit 203. As an example, as the (associated word search word, associated word candidate word, association degree), (Taro Matsushita, Hanako Matsushita, 60), (Taro Matsushita, Saburo Matsushita, 40), (Hanako Matsushita, Taro Matsushita, 60), (Hanako Matsushita, Saburo Matsushita, 70), (Saburo Matsushita, Taro Matsushita, 40) and (Saburo Matsushita, Hanako Matsushita, 70) are calculated, and the (associated word search word, associated word candidate word, association degree) the association degree of which is higher than the predetermined threshold value (as an example, 50) is added to the association dictionary storage unit 102 where the association degree stored in the association dictionary storage unit 102 shown in FIG. 2 has been attenuated by being multiplied by an attenuation parameter (as an example, 0.8). The details of the association dictionary storage unit 102 in this case are as shown in FIG. 9.

While in the present embodiment, when the association dictionary storage unit 102 is updated, in a case where an associated word pair the same as the associated word pair the association degree of which is newly calculated is already present in the association dictionary storage unit 102 after all the association degrees stored in the association dictionary storage unit 102 are attenuated, the association degree calculation unit 305 updates the association dictionary storage unit 102 by adding the association degrees already stored in the association dictionary storage unit 102 to the association degrees newly obtained by the association degree calculation unit 305, the present invention is not limited thereto. For example, the association degree calculation unit 305 may store the associated word pair, the association degree of which is newly calculated, as it is in the association dictionary storage unit 102 so as to be associated with the association degree.

While movie contents are searched for in the present embodiment, the present invention is not limited thereto. Hypertext or web pages on the Internet may be searched for. In this case, the screen creation unit 205 stores, in the display contents storage unit 202, the display text of the hypertext or the web page searched for by the search unit 110, and further, converts the hypertext or the text of the web page that is searched for into display screen information and outputs the display screen information to the display unit 204. As a concrete example, when a file "name.html" described in the HTML shown in FIG. 10 is searched for by the search unit 110, the screen creation unit 205 stores, in the display contents storage unit 202, the display text "Taro Matsushita, Hanako Matsushita, Saburo Matsushita, Jiro Matsushita" shown in FIG. 11B from the file "name.html", and further, converts the file "name.html" into display screen information and outputs the display screen information to the display unit 204 as shown in FIG. 11A. Further, the screen creation unit 205 may store only the displayed text in the display contents storage unit 202 when none of the text is displayed on the display unit 204. In the above-described embodiment, as an example, when the file "name.html" described in the HTML of FIG. 10 is displayed on the display unit as shown in FIG. 12A, the screen creation unit 205 stores only the display text "Taro Matsushita, Hanako Matsushita, Saburo Matsushita" in the display contents storage unit 202 as shown in FIG. 12B. By doing this, the association dictionary can be created only from the words extracted from the text of the contents watched by the user, so that an association dictionary adapted to the user's watching behavior can be created. Moreover, the screen creation unit 205 may treat the text displayed on the display unit 204 for not less than a predetermined time, as the displayed text. By doing this, the text that is merely displayed at the time of scrolling and is not watched by the user can be excluded.

While the screen creation unit 205 stores the text information regarding the contents searched for by the search unit 110 in the display contents storage unit 202, when the contents are movie contents and corresponding text is present for each scene or frame of the movie contents, the screen creation unit 205 may store only the text corresponding to the scenes or frames of the movie contents watched by the user in the display contents storage unit 202. By doing this, the association dictionary can be created only from the text corresponding to the scenes or frames of the movie contents watched by the user, so that a highly accurate association dictionary adapted to the user's watching behavior can be created for movie contents.

As described above, according to the present embodiment, by selecting the words to be stored in the association dictionary from the text on the contents watched by the user and further, calculating the association degree for the contents suiting the user's taste, an association dictionary can be created in which only words suiting the user's watching behavior are stored and the association degrees of the words are adapted to the user's taste. Furthermore, by using the created association dictionary when the user searches for the contents, extension of the search criteria can be carried out by performing association suiting the user's taste and using words which suit the user's taste. Consequently, the extended search result can be adapted to the user's watching behavior and further, the association can be adapted to the user's taste.

In the above-described first embodiment, the contents storage unit 101 corresponds to the database storing information to be searched for, the word selection unit 105 corresponds to the word selection unit, and the association degree calculation unit 106 corresponds to the associated word storage unit.

In the above-described second embodiment, the word selection unit 203 corresponds to the word selection unit, the screen creation unit 205 corresponds to the display information extraction unit, the association degree calculation unit 106 corresponds to the associated word storage unit, and the search unit 110 corresponds to the search unit.

In the above-described third embodiment, the taste contents extraction unit 302 corresponds to the taste suiting information extraction unit, the word selection unit 304 corresponds to the word selection unit, and the association degree calculation unit 305 corresponds to the associated word storage unit.

In the above-described fourth embodiment, the taste contents extraction unit 302 corresponds to the taste suiting information extraction unit, the word selection unit 203 corresponds to the word selection unit, the association degree calculation unit 305 corresponds to the associated word storage unit, the screen creation unit 205 corresponds to the display information extraction unit, and the search unit 110 corresponds to the search unit.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The association dictionary creation apparatus according to the present invention is capable of creating an association dictionary which can, in the case where a search criterion is extended by use of the association dictionary, adapt a search criterion added for the extension, to the user's taste and watching behavior, and is useful, for example, as a terminal or the like capable of searching for information by accessing hard disk recorders, DVD recorders, TVs, audio components and the Internet.

What is claimed is:

1. An association dictionary creation apparatus that creates an association dictionary storing a relationship between a plurality of words, the association dictionary creation apparatus comprising:

a word selection unit configured to select an arbitrary word from information representative of a user's taste as an associated word search word, and to select words, other than the associated word search word, included in the information representative of the user's taste, as associated word candidates;

a non-transitory database configured to store content;

an associated word storage unit configured to select an associated word associated with the associated word search word from among the associated word candidates, based on the content stored in the database, and to store the associated word search word and the associated word into the association dictionary in association with each other;

an input unit configured to obtain a search criterion including a search keyword;

a search criterion generation unit configured to obtain, from the association dictionary, the associated word associated with the search keyword included in the search criterion obtained by said input unit, and to generate, from the obtained associated word and the search key word, an extended search criterion indicating that one of the associated word and the search keyword is included; and a search unit configured to search the content stored in the database for information matching the extended search criterion generated by said search criterion generation unit, wherein said word selection unit is configured to obtain the information representative of the user's tastes from a profile in which information representative of the user's taste is stored, and to select the associated word search word and the associated word candidates when the profile is updated.

2. The association dictionary creation apparatus according to claim 1, wherein, in the profile, words representative of the user's taste and weight values representative of a degree of the user's preference for each of the words are stored in association with each other, and said word selection unit is configured to determine that the information representative of the user's taste is words of not less than a predetermined weight value stored in the profile.

3. The association dictionary creation apparatus according to claim 1, wherein said associated word storage unit is configured to calculate a degree of association between the associated word search word and each of the associated word candidates, based on a frequency of occurrence in the database, and to select an associated word candidate having a calculated degree of association which is not less than a threshold value as the associated word associated with the associated word search word.

4. The association dictionary creation apparatus according to claim 3, wherein when an association word pair and the degree of association are already stored in the association dictionary in association with each other, said associated word storage unit is configured to update the associated word pair and the degree of association stored in the association dictionary, using the calculated degree of association between the associated word search word and the associated word associated with the associated word search word.

5. The association dictionary creation apparatus according to claim 1, further comprising a display information extraction unit configured to extract information regarding an on-screen display perused by the user, wherein said word selection unit is configured to determine that the information regarding the on-screen display extracted by said display information extraction unit is the information representative of the user's taste, to select an arbitrary word from the information regarding the on-screen display as the associated word search word, and to select words, other than the associated word search word, included in the information regarding the on-screen display as associated word candidates.

6. The association dictionary creation apparatus according to claim 5, further comprising a search unit configured to search the database for information matching a search criterion, wherein the on-screen display perused by the user is a result of the information search, and said display information extraction unit is configured to extract information regarding the result of the information search as the information regarding the on-screen display.

7. The association dictionary creation apparatus according to claim 6, wherein said display information extraction unit is configured to extract, from the result of the information search, information displayed on a display screen for not less than a predetermined time as the information regarding the on-screen display.

8. The association dictionary creation apparatus according to claim 5, wherein the on-screen display perused by the user is broadcast programs, and said display information extraction unit is configured to extract information regarding the broadcast programs as the information regarding the on-screen display.

9. The association dictionary creation apparatus according to claim 8, wherein said display information extraction unit is configured to extract information regarding a broadcast program, among the broadcast programs, which is displayed on a display screen for not less than a predetermined time, as the information regarding the on-screen display.

10. The association dictionary creation apparatus according to claim 1, further comprising a taste suiting information extraction unit configured to extract information suiting the user's taste, from the database, as taste suiting information, using a profile in which information representative of the user's taste is stored, wherein said associated word storage unit is configured to select an associated word associated with the associated word search word from among the associated word candidates by referring to the taste suiting information extracted from the database, and to store the associated word search word and the associated word into the association dictionary in association with each other.

11. The association dictionary creation apparatus according to claim 10, wherein said word selection unit is configured to determine that the taste suiting information extracted by said taste suiting information extraction unit is the information representative of the user's taste, to select an arbitrary word from the taste suiting information as the associated word search word, and to select words, other than the associated word search word, included in the taste suiting information as associated word candidates.

12. The association dictionary creation apparatus according to claim 10, wherein said word selection unit is configured to obtain the information representative of the user's taste from the profile in which information representative of the user's taste is stored, to select an arbitrary word from the information representative of the user's taste as the associated word search word, and to select words, other than the associated word search word, included in the information representative of the user's taste as associated word candidates.

13. The association dictionary creation apparatus according to claim 1, further comprising:

a display information extraction unit configured to extract information regarding an on-screen display perused by the user; and a taste suiting information extraction unit configured to extract information suiting the user's taste from the database as taste suiting information, using of a profile in which information representative of the user's taste is stored, wherein said word selection unit is configured to determine that the information regarding the on-screen display extracted by said display information extraction unit is the information representative of the user's taste, to select an arbitrary word from the information regarding the on-screen display as the associated word search word, and to select words, other than the associated word search word, included in the information regarding the on-screen display as associated word candidates, and said associated word storage unit is configured to select an associated word associated with the associated word search word from among the associated word candidates, by referring to the taste suiting information extracted from the database, and to store the associated word search word and the associated word into the association dictionary in association with each other.

14. The association dictionary creation apparatus according to claim 1, further comprising A screen creation unit configured to convert a result of the search of the database into display screen information, to extract information regarding an on-screen display perused by the user from the display screen information obtained from the conversion, and to store the extracted information in the profile.

15. The association dictionary creation apparatus according to claim 1, wherein said search unit is configured to obtain, from the association dictionary, the associated word associated with the search keyword with a degree of association that is equal to or higher than a predetermined threshold value, and to generate the extended search criterion from the obtained associated word and the search keyword.

16. The association dictionary creation apparatus according to claim 1, wherein said associated word associated word storage unit is configured to select the associated word associated with the associated word search word from among the associated word candidates, based on mutual information MI calculated using an expression $MI=\log2(aN/((a+b)(a+c)))$ where the associated word search word W1, the associated word candidates is W2, a is the number of contents including the associated word search word W1 and the associated word candidates W2, b is the number of contents not including the associated word search word W1 and including the associated word candidates W2, c is the number of contents including the associated word search word W1 and not including the associates word candidates W2, d is the number of contents including neither the associated word search word W1 nor the associated word candidates W2, and N is the total number of the contents ($=a+b+c+d$).

17. The association dictionary creation apparatus according to claim 14, wherein, every time said screen creation unit stores text information regarding the result of the search in the profile, said word selection unit is configured to extract words by performing morphological analysis on the text information, to select the associated word search word from the extracted words, and to further select, as the associated word candidates, the extracted words other than the associated word search word.

18. The association dictionary creation apparatus according to claim 17, wherein said screen creation unit is configured to store the text information indicating the result of the search by said search unit in the profile, without user input, and said word selection unit is configured to select the associated word search word and the associated word candidates from the profile without user input.

19. The association dictionary creation apparatus according to claim 1, said associated word storage unit is further configured to select an associated word that is associated with the associated word search word from among the associated word candidates, based on mutual information calculated using a number of contents including the associated word search word and a number of contents including the associated word candidates, and to store the selected associated word and the associated word search word in the association dictionary in association with each other.

20. The association dictionary creation apparatus according to claim 19, wherein the mutual information increases when the number of contents including the associated word search word and the associated word candidates increases, and the mutual information decreases when the number of contents including the associated word search word and the associated word candidates decreases.

21. An association dictionary creation method for creating an association dictionary storing a relationship between a plurality of words, the association dictionary creation method comprising:

selecting, using a word selection unit, an arbitrary word from information representative of a user's taste as an associated word search word, and selecting words, other than the associated word search word, included in the information representative of the user's taste as associated word candidates;

storing content in a non-transitory database;

selecting, using an associated word storage unit, an associated word associated with the associated word search word from among the associated word candidates, based on the content stored in the database, and storing the associated word search word and the associated word into the association dictionary in association with each other;

obtaining, using an input unit, a search criterion including a search keyword;

obtaining, using a search criterion generation unit, from the association dictionary, the associated word associated with the search keyword included in the search criterion obtained, and generating, from the obtained associated word and the search key word, an extended search criterion indicating that one of the associated word and the search keyword is included; and searching, using a search unit, the content stored in the database for information matching the extended search criterion generated, wherein the information representative of the user's tastes is obtained from a profile in which information representative of the user's taste is stored, and the associated word search word and the associated word candidates are selected when the profile is updated.

22. A program stored on a non-transitory computer-readable medium for creating an association dictionary storing a relationship between a plurality of words, the program causing a computer to execute steps comprising:

selecting an arbitrary word from information representative of a user's taste as an associated word search word, and selecting words, other than the associated word search word, included in the information representative of the user's taste as associated word candidates;

storing content in a database;

selecting an associated word associated with the associated word search word from among the associated word candidates, based on the content stored in the database, and storing the associated word search word and the associated word into the association dictionary in association with each obtaining a search criterion including a search keyword;

obtaining, from the association dictionary, the associated word associated with the search keyword included in the search criterion obtained, and generating, from the obtained associated word and the search key word, an extended search criterion indicating that one of the associated word and the search keyword is included; and searching the content stored in the database for information matching the extended search criterion generated, wherein the information representative of the user's tastes is obtained from a profile in which information representative of the user's taste is stored, and the associated word search word and the associated word candidates are selected when the profile is updated.

* * * * *